(12) United States Patent
Zhou et al.

(10) Patent No.: US 10,432,925 B2
(45) Date of Patent: Oct. 1, 2019

(54) LIGHT FIELD DISPLAY CONTROL METHODS AND APPARATUS, AND LIGHT FIELD DISPLAY DEVICES

(71) Applicant: BEIJING ZHIGU TECH CO., LTD., Beijing (CN)

(72) Inventors: Liang Zhou, Beijing (CN); Lin Du, Beijing (CN)

(73) Assignee: BEIJING ZHIGU TECH CO., LTD., Beijing (CN)

(*) Notice: Subject to any disclaimer, the term of this patent is extended or adjusted under 35 U.S.C. 154(b) by 46 days.

(21) Appl. No.: 15/539,780

(22) PCT Filed: Sep. 10, 2015

(86) PCT No.: PCT/CN2015/089315
§ 371 (c)(1),
(2) Date: Jun. 26, 2017

(87) PCT Pub. No.: WO2016/107208
PCT Pub. Date: Jul. 7, 2016

(65) Prior Publication Data
US 2017/0353717 A1    Dec. 7, 2017

(30) Foreign Application Priority Data
Dec. 29, 2014    (CN) .......................... 2014 1 0837381

(51) Int. Cl.
*H04N 13/305* (2018.01)
*H04N 13/307* (2018.01)
(Continued)

(52) U.S. Cl.
CPC ......... *H04N 13/398* (2018.05); *H04N 9/3182* (2013.01); *H04N 13/305* (2018.05); *H04N 13/307* (2018.05)

(58) Field of Classification Search
CPC .......................... H04N 13/305; H04N 13/307
See application file for complete search history.

(56) References Cited

U.S. PATENT DOCUMENTS 6,195,068 B1 * 2/2001 Suzuki .................... G06F 3/147
345/2.2
6,351,335 B1 * 2/2002 Perlin .................... G02B 13/00
345/1.1
(Continued)

FOREIGN PATENT DOCUMENTS

CN    101175223 A    5/2008
CN    101411207 A    4/2009
(Continued)

OTHER PUBLICATIONS

Gaze-Contingent Multiresolutional Displays: An Integrative Review Eyal M. Reingold, Lester C. Loschky, George W. McConkie, and David M. Stampe Human Factors ,vol. 45, Issue 2, pp. 307-328, First Published Jun. 1, 2003 (Year: 2003).*
(Continued)

*Primary Examiner* — Jamie J Atala
*Assistant Examiner* — Michael Robert Cammarata
(74) *Attorney, Agent, or Firm* — Sheppard Mullin Richter & Hampton LLP

(57) ABSTRACT

The present application discloses a light field display control method and apparatus. The techniques of this disclosure provide a differentiated spatial resolution of different regions of a light field display image. The display pixel density distribution of the display of the light field display device is adjusted from original uniform distribution of display pixels to adjusted non-uniform distribution. The adjusted display pixels of the display includes non-uniform differentiated distribution. Sampling processing is then performed on a to-be-displayed light field image according to actual locations of the display pixels of the display, such that the light (Continued)

field image undergone the sampling processing corresponds to the actual locations of the display pixels of the display. The adjusted display displays the light field image that includes non-uniform differentiated distribution of pixels.

27 Claims, 13 Drawing Sheets

(51) Int. Cl.
*H04N 13/398* (2018.01)
*H04N 9/31* (2006.01)

(56) References Cited

U.S. PATENT DOCUMENTS

| | | | | |
|---|---|---|---|---|
| 7,010,169 | B2* | 3/2006 | Kortum | H04N 19/162 |
| | | | | 375/E7.172 |
| 7,030,855 | B2* | 4/2006 | Metcalf | G09G 3/20 |
| | | | | 345/108 |
| 7,495,638 | B2* | 2/2009 | Lamvik | G02B 27/0172 |
| | | | | 345/76 |
| 7,609,906 | B2 | 10/2009 | Matusik et al. | |
| 8,049,747 | B2* | 11/2011 | Arneson | G02B 5/02 |
| | | | | 345/214 |
| 8,698,859 | B2 | 4/2014 | DeLuca | |
| 9,135,863 | B2* | 9/2015 | Duerksen | G09G 3/34 |
| 9,292,973 | B2* | 3/2016 | Bar-Zeev | G02B 27/017 |
| 9,367,894 | B2* | 6/2016 | Kwon | G06F 3/0487 |
| 9,377,629 | B2* | 6/2016 | Lee | G02B 27/2214 |
| 9,804,699 | B2* | 10/2017 | Hyun | G06F 3/041 |
| 2007/0097108 | A1* | 5/2007 | Brewer | G02B 6/06 |
| | | | | 345/204 |
| 2007/0229653 | A1* | 10/2007 | Matusik | H04N 13/122 |
| | | | | 348/51 |
| 2008/0224948 | A1* | 9/2008 | Alberth | G09G 3/20 |
| | | | | 345/1.3 |
| 2008/0224951 | A1* | 9/2008 | Alberth | G06F 1/1601 |
| | | | | 345/55 |
| 2010/0289819 | A1 | 11/2010 | Singh et al. | |
| 2012/0250151 | A1* | 10/2012 | Lee | G02B 27/2214 |
| | | | | 359/463 |
| 2013/0063492 | A1 | 3/2013 | Washington et al. | |
| 2014/0125957 | A1* | 5/2014 | Lee | G02B 27/2264 |
| | | | | 353/37 |
| 2014/0327750 | A1 | 11/2014 | Malachowsky et al. | |
| 2017/0229523 | A1* | 8/2017 | Du | H04N 5/232 |
| 2017/0316733 | A1* | 11/2017 | Du | H01L 51/56 |
| 2017/0337904 | A1* | 11/2017 | Du | G09G 3/32 |

FOREIGN PATENT DOCUMENTS

| | | |
|---|---|---|
| CN | 103813152 A | 5/2014 |
| CN | 104157660 A | 11/2014 |
| CN | 104159025 A | 11/2014 |
| CN | 104469343 A | 3/2015 |
| CN | 104469344 A | 3/2015 |
| CN | 104519347 A | 4/2015 |
| CN | 104537975 A | 4/2015 |

OTHER PUBLICATIONS

International Search Report and Written Opinion for Application No. PCT/CN2015/089315, dated Oct. 29, 2015, 8 pages.
Hirsch et al., "A Compressive Light Field Projection System," ACM Transactions on Graphics, 2014, 12 pages.
Huang et al., "Eyeglasses-free Display: Towards Correcting Visual Aberrations with Computational Light Field Displays," Jul. 2014, ACM Transactions on Graphics, vol. 33, No. 4, Article 59, 12 pages.
Lanman et al., "Near-Eye Light Field Displays," ACM Transactions on Graphics, 2013, 10 pages.
Maimone, A., "Focus 3D: Compressive Accommodation Display," ACM Transactions on Graphics, 2013, 12 pages.

* cited by examiner

LIGHT FIELD DISPLAY CONTROL METHODS AND APPARATUS, AND LIGHT FIELD DISPLAY DEVICES

CROSS-REFERENCE TO RELATED APPLICATIONS

This application is a National Phase Application of International Application No. PCT/CN2015/089315, filed on Sep. 10, 2015, which claims the benefit of priority to Chinese Patent Application No. 201410837381.9, filed on Dec. 29, 2014, and entitled "Light Field Display Control Methods and Apparatus, and Light Field Display Devices", each of which is incorporated by reference herein in its entirety.

TECHNICAL FIELD

The present application relates to the field of light field display technologies, and in particular, to various light field display control methods and apparatus and various light field display devices.

BACKGROUND

The light field display technology has been proposed at the initial of the $20^{th}$ century, and two representative implementation manners thereof are: an implementation manner based on a Lenslet array by Lippmann in 1908, and an implementation manner based on Parallax Barriers by Ives in 1903. In recent years, along with diversified requirements of consumer electronic products on display devices, the light field display technology is applied to various scenarios and devices, such as, a 3D display, a wearable device, and a light field display for vision correction. Currently, gradual matching of requirements of calculation capabilities of electronic devices, display resolution and the light field display technology on hardware resources provides a good support for promotion and application of the light field display technology.

The light field display technology can implement a relatively flexible display effect by using a hardware structure similar to the conventional light field display technology, such as light field 3D display, light field projection display, light field near-to-eye display on a wearable device, and vision correction of light field display. However, the cost for implementing the flexible display property is sacrificing the display resolution; in other words, based on the same display pixel condition, the spatial resolution of an image displayed by using the light field display technology is lower than the spatial resolution of a conventional image, and how to improve the spatial resolution of the light field display image becomes a research hotspot in the art.

SUMMARY

A brief description of the present application is provided hereinafter, so as to provide basic understanding of the present application in some aspects. It should be understood that this description is not an exhaustive description of the present application. It is not intended to determine key or important parts of the present application, nor intended to limit the scope of the present application. An objective is merely providing some concepts in a simplified form, and this is used as a preorder of more detailed descriptions made later.

The present application provides various light field display control methods and apparatus, and various light field display devices.

In one aspect, an embodiment of the present application provides a light field display control method, comprising:

adjusting a display pixel density distribution of a display of a light field display device;

performing sampling processing on a light field image according to location information of display pixels of the display after the adjustment; and displaying, by the light field display device after the adjustment, the light field image undergone the sampling processing.

In another aspect, an embodiment of the present application further provides a light field display control apparatus, comprising:

a display pixel density distribution adjusting module, configured to adjust display pixel density distribution of a display of a light field display device;

an image sampling processing module, configured to perform sampling processing on a light field image according to location information of display pixels of the display after the adjustment; and a light field display controlling module, configured to display, by the light field display device after the adjustment, the light field image undergone the sampling processing.

In still another aspect, an embodiment of the present application provides a light field display device. The device includes a display; a lenslet array; and a light field display control apparatus provided by any one of the embodiments of the present application. The light field display control apparatus is in communication connection with the display.

The technical solution provided in the embodiments of the present application can present differentiated spatial resolution of different regions of a light field display image by fully using pixels of a display of a light field display device. Specifically, the display pixel density distribution of the display of the light field display device is adjusted, for example, from original uniform distribution of display pixels to adjusted non-uniform distribution, such that the adjusted display pixels of the display assume non-uniform differentiated distribution. For example, the display pixel density of a local region of the display is large and the display pixel density of another local region is small. After that, sampling processing is performed on a to-be-displayed light field image according to actual locations of the display pixels of the display, such that the light field image that is been through the sampling processing is corresponding to the actual locations of the display pixels of the display. Finally, the adjusted display displays the light field image that is been through the sampling processing. In this way, a lenslet array of the light field display device is used to view the light field image that is been through the sampling processing and displayed by the display, so as to obtain the displayed light field image having differentiated distribution of definition. For example, a spatial resolution of an image part displayed by a display region of the display having a large display pixel density is greater than a spatial resolution of an image part displayed by a display region of the display having a small display pixel density, and therefore, requirements of a user on differentiated display of local definition of an image may be met by fully using existing pixels of the display.

These and other advantages of the present application will be more obvious through detailed descriptions of optional embodiments of the present application in combination with the accompanying drawings.

BRIEF DESCRIPTION OF THE DRAWINGS

The present application may be better understood with reference to the descriptions made through the accompanying drawings, and in all the accompanying drawings, the same or similar reference numerals are used to indicate the same or similar components. The accompanying drawings together with the following detailed descriptions are comprised in the specification and form a part of the specification, and are used to further describe the optical embodiments of the present application and explain the principles and advantages of the present application. In the accompanying drawings:

FIG. 3b is an example of a light field image corresponding to the image shown in FIG. 3a;

Figure 1A:
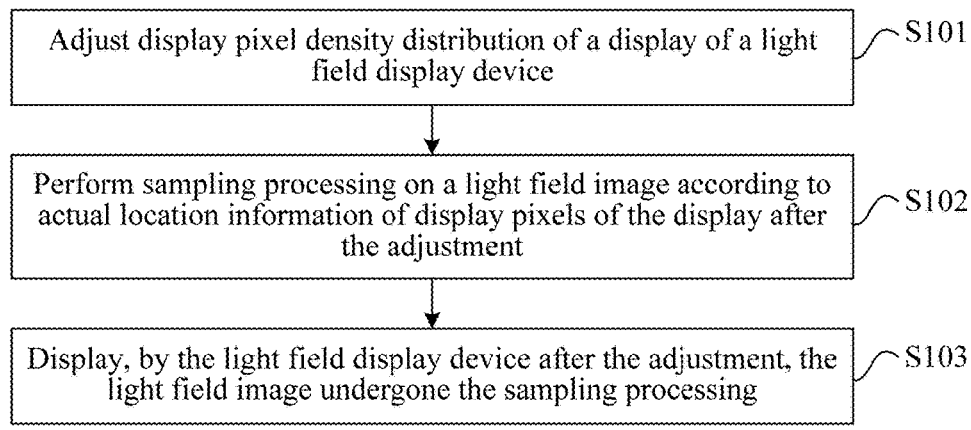
FIG. 1a is a flow chart of a light field display control method according to an embodiment of the present application.

A person skilled in the art should understand that elements in the accompanying drawings are shown merely for simplicity and clarity, and are not necessarily drawn according to the proportion. For example, sizes of some elements in the accompanying drawings may be enlarged relative to other elements, so as to facilitate understanding on the embodiments of the present application.

DETAILED DESCRIPTION

Exemplary embodiments of the present application are described in detail in the following through the accompanying drawings. For clarity and simplicity, not all features of actual implementation manners are described in the specification. However, it should be understood that in a process of developing any actual embodiment, many decisions specific to the implementation manner must be made to implement specific objectives of developers, for example, meeting limitation conditions related to a system and service, and the limitation conditions may vary according to different implementation manners. Moreover, it should be further understood that, although the development work may be very complicated and time consuming, the development work is merely a routine task for a person skilled in the art and benefited from the content of the present disclosure.

Here, it should be further noted that, to avoid that the present application is vague due to unnecessary details, merely apparatus structures and/or processing steps closely related to the solution of the present application are described in the accompanying drawings and the specification, and expressions and descriptions on parts and processing that are less related to the present application and known by a person of ordinary skill in the art are omitted.

Specific embodiments of the present application are further described in detail through the accompanying drawings (the same reference numerals in several accompanying drawings indicate the same elements) and embodiments. The following embodiments are used to describe the present application, but are not intended to limit the scope of the present application.

Persons skilled in the art should understand that terms such as "first" and "second" in the present application are merely used to distinguish different steps, devices, modules or the like, and the terms neither represent any specific technical meanings nor indicate necessary logic orders of them.

During practicing embodiments of the present application, the inventor of the present application finds that, generally when a light field display device performs light field display, display pixel density distribution of a display of the light field display device is unchanged, and based on this, the display capability of the display has a certain limitation in term of meeting diversified application requirements of users. In some scenarios, different regions in a certain frame of image generally have different meanings and/or importance for the users, that is, the users have different degrees of interest for different regions of the displayed image. For example, in a character light field display scenario, the user has a higher degree of interest on a human face in the image than that on a scene in the image; and the like. By using the light field display technology, when the image is displayed, a certain degree of spatial resolution of the displayed image may be sacrificed, and therefore, the spatial resolution of the image displayed by light field display based on the light field display technology is low. If the light field display quality of a region of interest is to be improved, a high resolution display may be used to improve the overall definition of the displayed image; however, the power consumption that needs to be consumed is large. If the user has different requirements on display definition of different regions of one image, for example, the user may merely concern the definition of a part (such as a human face, a license plate number, and other regions of interest) in the image, and has a low requirement on the definition of other parts (such as the background and a road) in the image, in this case, if a high resolution display is merely used to display the image, the actual utilization of display pixels may be low, which increases the power consumption.

Therefore, an embodiment of the present application provides a light field display control method, which may fully use pixels of a display of a light field display device to present differentiated spatial resolutions of different regions of a light field display image, thereby better meeting diversified application requirements of users. The technical solution is described through the accompanying drawings.

FIG. 1a is a flow chart of a light field display control method according to an embodiment of the present application. The light field display control method provided in the embodiment of the present application may be executed by a certain light field display control apparatus, and the light field display control apparatus can perform display control on an image by executing the light field display control method in a process involving an application comprising, but not limited to, image presentation and video playback. The presentation form of the device of the light field display control apparatus is not limited. For example, the light field display control apparatus may be a certain independent component, and the component cooperatively communicates with a light field display device comprising a display; or the light field display control apparatus may be integrated in a display device comprising a display as a certain functional module, and the light field display device may comprise, but not limited to, a device having a light field display capability and comprising the display, such as a television, a computer, a camera, a mobile phone, and a video recorder.

Specifically, as shown in FIG. 1a, a light field display control method provided in the embodiment of the present application comprises:

S101: Adjust display pixel density distribution of a display of a light field display device.

Figure 2:
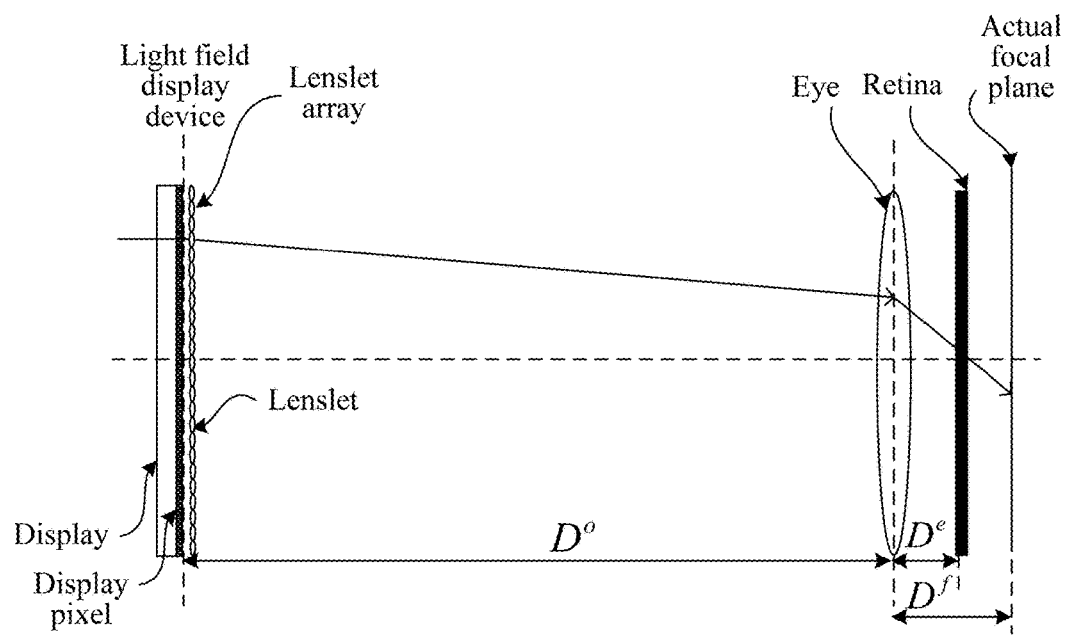
FIG. 2 is an example of an optional optical path displayed by a light field according to an embodiment of the present application.

Different from the conventional display device, the light field display device may be provided with a lenslet array near the display. As shown in FIG. 2, the lenslet array may also be referred to as a micro lens array, and comprises multiple lenslets (or referred to as micro lenses) distributed in an array. A propagation direction of light ray from the display is changed by at least one lenslet in the lenslet array, and the light ray having the propagation direction changed is converged through an eye of the user (similar to a lens) to image on a retina of the user. The display comprises multiple display regions, one display region comprises multiple display pixels and one display region is corresponding to a lenslet. In other words, in the light field display device, the lenslet array and the display pixels of the display have a one-to-more correspondence, and information of the same part of a to-be-displayed image at different visual angles may be displayed by using multiple display pixels of the display, thereby implementing abundant display properties of a light field image.

However, when a light field image implements abundant and flexible display effects, a spatial resolution of the displayed light field image is reduced relative to the conventional display technology. For example, it is assumed that the lenslet array comprises M*N lenslets, the resolution of the display is A*B, and A*B pixels of the display are divided into M*N display regions (A is greater than M, and B is greater than N). In a case of a display region of a display corresponding to a lenslet, light rays emitted by display pixels of the display region have their propagation directions being changed by the lenslet corresponding to the display region, and then are converged in the eye of the user. Each display region comprises X*Y pixels, the spatial resolution of the displayed light field image is corresponding to distribution of lenslets of the lenslet array, being M*N, and the spatial resolution is lower than the resolution A*B of the display. Similarly, in a case that one lenslet corresponds to multiple display regions of the display, a spatial resolution of a light field image displayed by the display is generally between M*N and A*B, and correspondingly, a resolution A*B of the display is low. Light rays emitted by display pixels of different display regions have their propagation directions being changed by the corresponding lenslet, and then are converged in the eye of the user, so as to form a light field image relative to the user. According to abundance of light field image information, the light field image finally presented to the user may be a focused image having a different depth, a vision correction image directed to the user, and the like. However, generally, the display light field image has a lower definition than an image displayed by using the conventional display technology.

In the embodiment of the present application, the display of the light field display device is a pixel density adjustable display, and the display may comprise, but not limited to, a flexible display. The flexible display at least comprises a flexible substrate and multiple display pixels formed on the flexible substrate, wherein the flexible substrate may have various changes such as stretching and bending when meeting a certain condition, so as to adjust display pixel density distribution thereof. The display pixel may comprise, but not limited to, at least one light emitting unit. The light emitting unit may comprise, but not limited to a light emitting diode (LED) light emitting unit and an organic light emitting diode (OLED) light emitting unit. A light emitting color of the light emitting unit may be determined according to an actual requirement, and the light emitting unit may comprise, but not limited to, one or more light emitting sub-units; the light emitting sub-unit may comprise an LED light emitting sub-unit and an OLED light emitting sub-unit. The multiple light emitting sub-units may comprise, but not limited to, LED light emitting sub-units and OLED light emitting sub-units having different colors such as red (R), green (G) and blue (B).

In combination with the characteristic of adjustable display pixel density distribution of the display, the embodiment of the present application may adjust the display pixel density distribution of the display of the light field display device according to an actual requirement, to cause that the pixel density distribution of the display after the adjustment matches with the differentiated distribution of the spatial resolution (or definition) of the light field image expected to be displayed, for example, the clear image part of the light field image expected to be display corresponds to a large actual display pixel density of the display, and the blurred image part of the light field image expected to be display corresponds to a small actual display pixel density of the display, and the like.

S102: Perform sampling processing on a light field image according to actual location information of display pixels of the display after the adjustment.

Figure 3A:
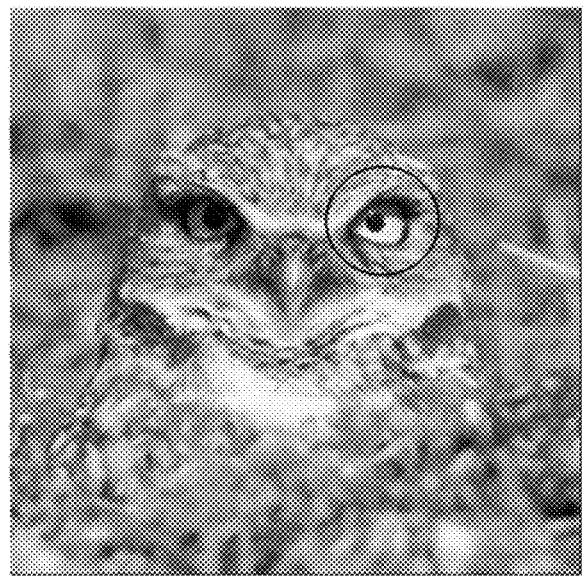
FIG. 3a is an example of a to-be-displayed image according to an embodiment of the present application.
Figure 3B:
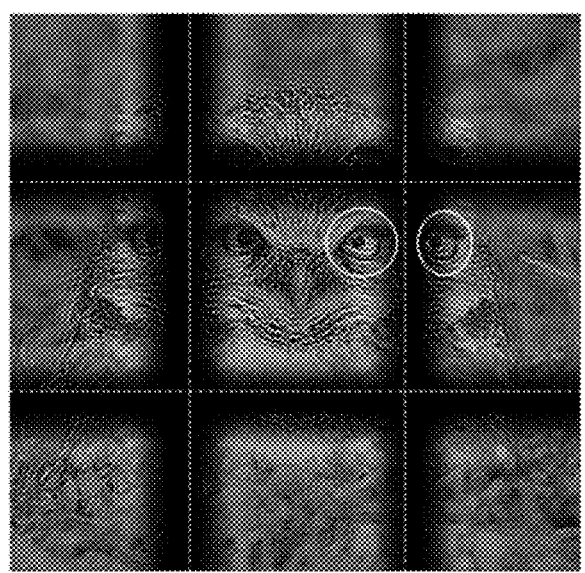

An example of the to-be-displayed image is shown in FIG. 3a, and is generally a clear image. The light field image corresponding to the image shown in FIG. 3a is generally a blurred image if being viewed directly from the display of the light field display device, as shown in FIG. 3b. The blurred image is "divided" into multiple sub-images. Each sub-image (which may be referred to as a light field sub-image) is displayed on at least one display region of the display. In some situations, for light field sub-images displayed by adjacent display regions, display content in a region within a certain range close to the boundary may be partially overlapped, for example, a situation that an eye part of the image marked by lines shown in FIG. 3b has partial content overlapped in two adjacent display regions. The overlapped content is used to remove aberration generated when light rays of different light field sub-images have their propagation directions being changed by different lenslets and then converged on a retina of the human eye, to cause that a display position of the actual display content is adjusted within a range before or after the screen of the display, therefore, the light field image displayed by the display and viewed by the human eye through the lenslet array is a clear image having successive content.

In the actual application, light field capture or pre-processing may be performed on the to-be-displayed image according to expected presentation effect, so as to obtain the light field image, to cause that when an image of the first light field image is acquired at the retina of the human eye by using the display and the lenslet array according to the reversibility principle of an optical path, the image is an image with aberration being removed. In other words, the light field display may be considered as a reversible process of an optical path of light field capture to some extent. The to-be-displayed light field image and display pixels of the display have a certain correspondence, and actual positions of some display pixels of the display after the adjustment may be changed; therefore, sampling processing may be performed on the light field image according to the actual positions of the display pixels of the display after the adjustment, to cause that the light field image undergone the sampling processing is corresponding to the actual positions of the display pixels of the display. The specific sampling method is not limited in the embodiment of the present application. For example, but not limited to, down sampling may be performed on the light field image according to actual location information of the display pixels of the display after the adjustment.

S103: Display, by the light field display device after the adjustment, the light field image undergone the sampling processing.

Figure 3C:
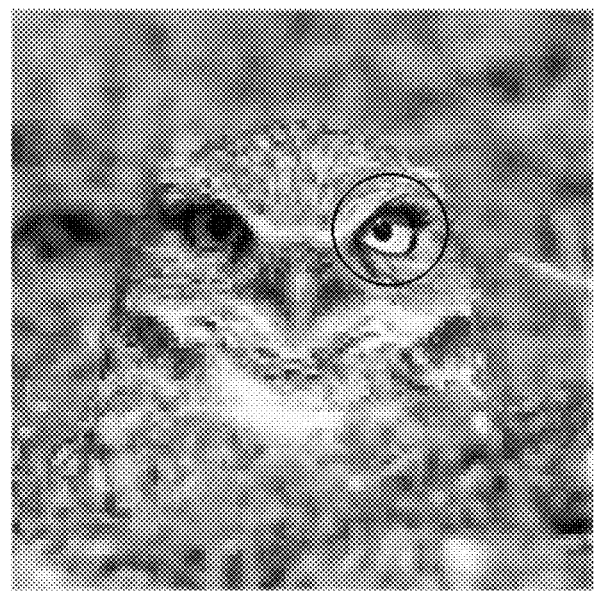
FIG. 3c is an example of an effect of the light field image shown in FIG. 3b by a light field display device after the adjustment and viewed by a human eye.
Figure 4A:
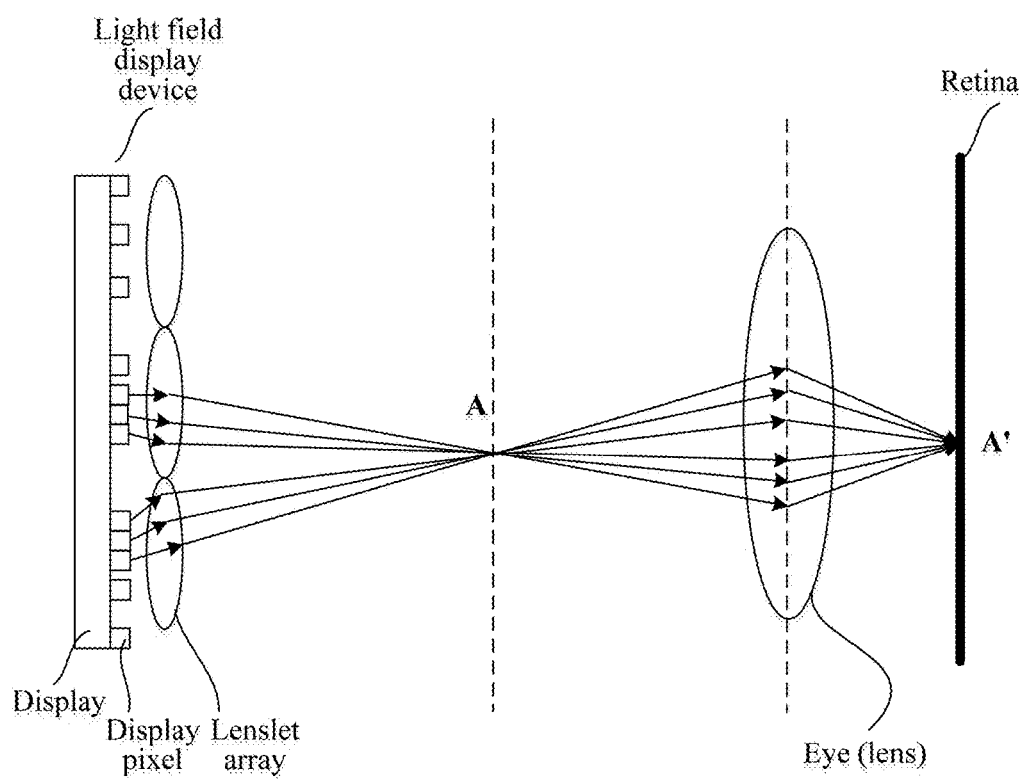
FIG. 4a is an example of an optional optical path displayed based on an adjusted display according to an embodiment of the present application.

After the display of the light field display device is adjusted, the display pixel density of the display is distributed non-uniformly, as shown in FIG. 4a (FIG. 4a merely shows an example of differentiating the display pixel density distribution by using a case that the total number of the display pixel is small, which should not be understood as a limit to the essence of the technical solution of the embodiment of the present application). A part of display regions of the display after the adjustment have more pixels to display partial content of the light field image, and a part of display regions have less pixels to display other partial content of the light field image, which is equivalent to perform readjustment on the display pixels of the display, to satisfy presentation of the display effect of differentiated image spatial resolutions. If the actually displayed light field image does not perform the sampling processing according to the actual location information of the display pixels of the display after the adjustment, it may cause that a part of the actually displayed light field image is deformed (for example, a situation such as that a part of the light field image correspondingly displayed by the display region having large display pixel density may be amplified), and the light field image displayed according to the actual situation in the technical solution provided in the embodiment of the present application performs the sampling processing according to the actual location information of the display pixels of the display after the adjustment, and therefore, deformation influences caused by adjustment of the display pixels of the display on display proportions of different parts of the actually display light field image may be reduced as much as possible, and different parts of the actually displayed light field image present differentiated spatial resolutions or definitions, thereby improving the display effect and the user experience. For example, an effect example of the light field image in FIG. 3b shown by the light field display device after the adjustment and viewed by the human eye is shown in FIG. 3c. The image shown in FIG. 3c is partially clear and partially blurred, thereby presenting the differentiated distribution of the spatial resolution.

The technical solution provided in the embodiments of the present application can present differential spatial resolution of different regions of a light field display image by fully using pixels of a display of a light field display device. Specifically, the display pixel density distribution of the display of the light field display device is adjusted, for example, from original uniform distribution of display pixels to adjusted non-uniform distribution, such that the adjusted display pixels of the display assume non-uniform differentiated distribution, for example, the display pixel density of a local region of the display is large and the display pixel density of another local region is small; after that, sampling processing is performed on a to-be-displayed light field image according to actual locations of the display pixels of the display, such that the light field image undergone the sampling processing is corresponding to the actual locations of the display pixels of the display; and finally, the adjusted display displays the light field image undergone the sampling processing, and in this way, a lenslet array of the light field display device is used to view the light field image undergone the sampling processing and displayed by the display, so as to obtain the displayed light field image having differentiated distribution of definition, for example, a spatial resolution of an image part displayed by a display region of the display having a large display pixel density is greater than a spatial resolution of an image part displayed by a display region of the display having a small display pixel density, and therefore, requirements of a user on differentiated display of local definition of an image may be met by fully using existing pixels of the display.

Optionally, the light field display control method provided in the embodiment of the present application may further comprise: pre-processing the image to obtain the light field image corresponding to the image. The solution performs pre-processing on the image content, and converts the image into a light field image displayed by substantially restoring the content by using the light field display device according to the reversibility principle of an optical path, thereby meeting light field display application requirements of most images, and improving the universality of the solution.

Optionally, the pre-processing the image to obtain the light field image corresponding to the image comprises: pre-processing the image according to vision information of a user to obtain the light field image. The solution may perform the pre-processing on the content of the to-be-displayed image directed to the vision information of the user, and convert the image into a light field image displayed by substantially restoring the content by using the light field display device according to the reversibility principle of an optical path. The displayed light field image is a clear image having an aligned focal point for the user. The solution can not only be applied to pre-processing scenario a light field image corresponding to the image viewed by a user having normal relative vision, and can also be applied to pre-processing of a light field image corresponding to the source image viewed by a user having relative vision that needs to be corrected (such as far-sighted or short-sighted), and the implementation manner thereof is flexible.

An optional implementation manner of pre-processing the image to obtain the light field image is described by using an equivalent optical path shown in FIG. 2 as an example. Optionally, the image may be pre-processed in a manner of constructing a conversion matrix according to the vision information of the user, so as to obtain a light field image having a certain aberration. The aberration may be counteracted through change of the optical path of the lenslet array to form a re-focused image relative to the vision information. A simplified physical model is described as follows:

$$i = P \times l^d \quad (1)$$

In the above equation, i represents the image, $l^d$ represents a to-be-solved pre-processing light field image, and P represents a conversion matrix determined according to the vision information of the user, wherein:

$$P = \begin{pmatrix} -\frac{D^o}{D^e} & D^o \Delta \\ 0 & 1 \end{pmatrix} \quad (2)$$

In the above equation:

$$\Delta = \frac{1}{D^e} - \frac{1}{f} + \frac{1}{D^o} \quad (3)$$

wherein, $D^o$ represents a distance between a pupil of an eye of the user and a screen of the display of the light field display device, $D^e$ represents a distance between the pupil of the eye of the user and a retina, and f represents a lens focal length of an eyeball. If a certain user is a user having normal vision, an actual focal plane of the eye is generally the retina when the user views an object clearly by naked eyes; and if a certain user has vision that needs to be corrected, such as a short-sighted user or a far-sighted user, an actual focal plane of the object when the user views an object clearly by naked eyes is generally not on the retina, for example, a certain plane after the retina is the actual focal plane of the user. A distance between the pupil of the user to the actual focal plane is represented as $D^f$:

$$D^f = \frac{fD^o}{D^o - f} \quad (4)$$

The pre-processed light field image, that is, $l^d$, related to the image may be obtained according to the above equations. The display control apparatus sends the light field image obtained after the pre-processing to the display of the main display device for display, and the light field image viewed by the user by using the display is blurred. For example, if the light field image is divided into multiple sub-images (that is, light field sub-images), each light field sub-image is corresponding to at least one lenslet of the lenslet array, and in this way, adjacent two light field sub-images may have a part of content being repeated, which is an effect of light field information overlapping. Propagation directions of light rays displayed by the display are changed by the lenslet array disposed adjacent to the display, and light rays having their propagation directions being changed by the lenslets in the lenslet array reimage, and the reimaged image counteracts the aberration introduced in the pre-processing process, and therefore, the focal point is aligned for the user having the vision information. In other words, the image is pre-processed and is displayed by the lenslet array to form a refocused image relative to the image, and when the user having the vision information views the image by using the lenslet array, the viewed image is imaged on the actual focal plane of the user; therefore, the user having normal vision or the user having vision that needs to be corrected can view a clear image having the focal point aligned by using naked eyes (that is, the user having vision that needs to be corrected does not need to wear a vision correction device) through the lenslet array.

Optionally, the light field display control method may further comprise: acquiring vision information of the user. The solution can acquire the vision information of the user, and pre-processes the content of the to-be-displayed image accordingly, to cause that the light field image obtained by pre-processing is more matching with the vision information of the user, thereby improving the viewing effect of the user. The vision information may comprise, but not limited to $D^o$, $D^e$, f, $D^f$ and the like. The vision information may be acquired at once, and may also be acquired dynamically in a process of image displaying, so as to implement dynamic adjustment of a processing result by tracking eyes of the user, to cause that the light field image displayed when the eye viewing position of the user is changed is a certain focal point aligned image relative to the current viewing position of the user, thereby improving the viewing effect and improving the user experience.

Optionally, the adjusting the display pixel density distribution of the display of the light field display device comprises: determining target pixel density distribution information; and adjusting the display pixel density distribution of the display according to the target pixel density distribution information, to cause that at least two display regions in the display after the adjustment have different display pixel densities. The target pixel density distribution information is generally used to indicate relative expectations of the user or device on display definition of different regions of the to-be-displayed image. For example, for a region having a high expectation on the display definition of the to-be-displayed image, it is expected to be displayed by using a large display pixel density, and the target pixel density displayed corresponding to the region is large, so as to improve the definition of image displaying of the region;

the requirement on the image display definition may be appropriately reduced for other regions of the image, and the images of other regions may be displayed by smaller display pixel density, and therefore, the display pixel densities of different display regions of the display have a difference, so as to present the display definition of different parts of the light field image in a differentiated manner. In the solution, in the target pixel density distribution information, the target display pixel density distributions respectively corresponding to at least two different display regions of the display are different, and in this way, the pixel distribution of the display is adjusted according to the target pixel density distribution information, and the actual pixel density distribution of the display after the adjustment is equal to or as close as possible to the target pixel density distribution information, to cause that the actual display pixel density distributions of at least two display regions in the display after the adjustment are different, for example, the actual display pixel density of a certain display region is large and the actual display pixel density of another display region is small, and the like. Therefore, the display pixels of the display are redistributed and adjusted, so as to present the spatial resolution of the light field display image in a differentiated manner.

In the technical solution provided in the embodiment of the present application, the manner of acquiring the target pixel density distribution information is not limited.

In an optional implementation manner, a first region of the image may be determined; light field sub-image information corresponding to the first region in the light field image is determined; a first display region that affects displaying of the light field sub-image information in the display is determined; the target pixel density distribution information is determined according to the first display region, wherein in the target pixel density distribution information, the target pixel density corresponding to the first display region is different from the target pixel density corresponding to the second display region, and the second display region being at least a part of display region of the display other than the first display region. When a certain image (for example, a two-dimensional non-light field image) needs to perform light field display, content of the image may be pre-processed to obtain a light field image corresponding to the image, and the light field image is generally blurred if being viewed by using the display (without using the lenslet array), and in order that the light field image has its light propagation direction being changed by the lenslet array and then forms a clear image in the human eye, contents of local regions of the light field image have certain repetition, for example, display contents of light field sub-images displayed by two adjacent display regions of the display are partially overlapped in a region within a certain range near the boundaries, as shown in FIG. 3b. Therefore, after the first region of the image is determined, light field sub-image information matching with the content of the first region may be determined according to a correspondence between the first region and the image as well as the light field image thereof, wherein the content of the light field sub-image matching with the content of the first region may have partial repetition. A first display region that affects displaying of light field sub-image information in the display is determined, and the first display region is generally a display region whose display pixel density is to be adjusted, for example, a display region whose display pixel density needs to be increased or a display region whose display pixel density needs to be reduced. The display pixel density distribution information of the display is determined according to the light field sub-image information, and in the target pixel density distribution information, the target pixel density corresponding to the first display region is different from the target pixel density corresponding to the second display region, for example, the target pixel density corresponding to the first display region is greater than the target pixel density corresponding to the second display region, or the target pixel density corresponding to the first display region is less than the target pixel density corresponding to the second display region, or the like. The pixel distribution of the display is adjusted according to the target pixel density distribution information, to cause that the actual pixel density distribution of the display after the adjustment is equal to or as close as possible to the target pixel density distribution information. The solution can determine a part of the image as the first region according to an actual requirement, and adjust the pixel density distribution information of the display flexibly accordingly, to cause that the display after the adjustment has more pixels for displaying the light field sub-image information corresponding to the first region, or to cause that the display after the adjustment can use a part of display pixels originally used for displaying the light field sub-image information corresponding to the first region to display light field sub-image information of the image corresponding to another region other than the first region. It can be seen that, the solution can fully use the existing display pixels of the display, readjusts the density distribution thereof, so as to present a display effect of displaying spatial resolutions of the light field image in a differentiated manner, thereby improving the actual utilization of the display pixels, and better meeting diversified actual application requirements of the users.

Figure 4B:
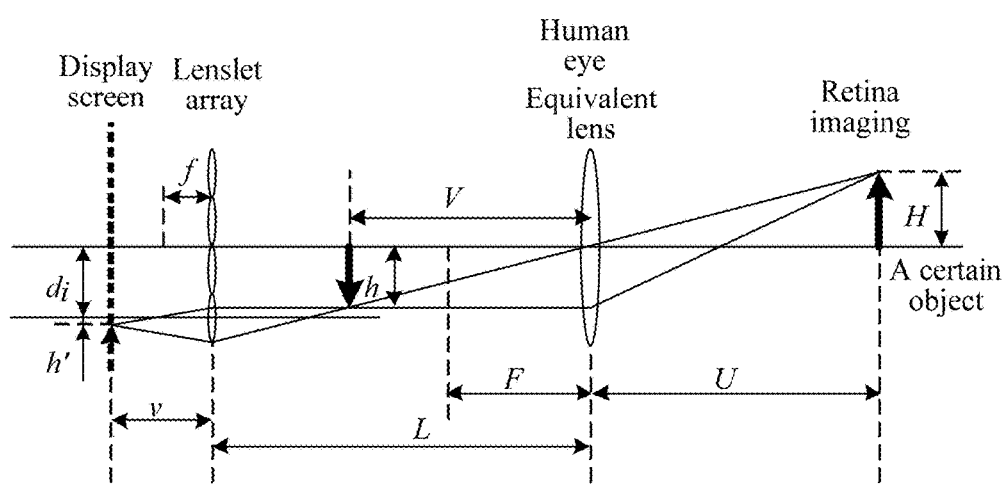
FIG. 4b is an example of another optional optical path displayed by a light field according to an embodiment of the present application.

In another optional implementation manner, a first region of the image may be determined; a first display region of the display is determined according to relative location information of pixels of the first region relative to a reference point of the image; and the target pixel density distribution information is determined according to the first display region, wherein in the target pixel density distribution information, the target pixel density corresponding to the first display region is different from the target pixel density corresponding to the second display region, and the second display region being at least a part of display region of the display other than the first display region. The reference point of the image may be selected flexibly according to an actual requirement, for example, it may be, but not limited to, a centre of the image, and the centre may be, but not limited to, corresponding to a centre of eyes of a viewer, and the like. When a user views a light field image displayed by the display by using the lenslet array, an image may be formed at a retina of the user, and the image is proportionally corresponding to the image (an original to-be-displayed image) corresponding to the light field image, and therefore, a correspondence between the image and the display region of the display may be deduced according to imaging information of the retina, referring to FIG. 4b:

The following equations may be obtained according to an imaging formula and trigonometry relations:

$$\frac{1}{U} + \frac{1}{V} = \frac{1}{F} \quad (1)$$

$$\frac{1}{v} + \frac{1}{L-V} = \frac{1}{f} \quad (2)$$

-continued $$\frac{H}{h} = \frac{U}{V} \quad (3)$$

$$\frac{d_i - h}{h'} = \frac{L - V}{v} \quad (4)$$

wherein, U, h and F are unknown, and others are known; U, V and L are respectively distances from the pupil of an eyeball lens to the retina, to a display image, and to the lenslet array, F and f are respectively focal lengths of the eyeball and the lenslet, v is a distance from the lenslet array to the pixel of the display, H, h and h' are respectively image sizes of a certain object on the retina, on a virtual image plane, and on an imaging region corresponding to the $i^{th}$ lenslet, and $d_i$ is a distance from the $i^{th}$ lenslet to a reference point, and the reference point may be any point of the image. Here, an intersection of an optical axis of the eyeball lens and the display is used as an example to simplify the calculation, and the following equation may be obtained according to equations (1) to (4):

$$h' = \frac{(d_i U - LH)(v - f)}{fU} + \frac{Hv}{U} \quad (5)$$

Therefore, for any point imaged on the retina (it is assumed that a distance from the point to the optical centre of the eyeball lens is H, the point is equivalent to a certain pixel point corresponding to the image, and H is equivalent to relative location information of the corresponding pixel point relative to the image and a reference point corresponding to the optical centre of the eyeball lens), h' thereof on an imaging region corresponding to the $i^{th}$ lenslet can be calculated, that is, an imaging point position on the imaging region corresponding to the $i^{th}$ lenslet can be obtained by mapping. The first region of the image is corresponding to multiple points of an image region of retina imaging, and h' on the imaging region respectively corresponding to multiple points may be obtained through calculation according to the above method, so as to determine a certain display region of the display, and the obtained display region of the display is a region that affects displaying of the light field sub-image information corresponding to the first region, that is, the first display region of the embodiment of the present application. By using the solution, the region that affects displaying of the light field sub-image corresponding to the first region may be determined, and the implementation solution is simple. Optionally, the display comprises display regions respectively corresponding to various lenslets in a lenslet array of the light field display device, and the first display region is distributed in at least one of the display regions. The first display region is the display region that affects displaying of the light field sub-image corresponding to the first region in the display. The light field sub-image corresponding to the first region may be distributed in one display region of the display, and in this case, the first display region that affects displaying of the light field sub-image is distributed in one display region of the display. Or, the light field sub-image corresponding to the first region may be distributed in multiple display regions of the display, (for example, the two adjacent regions, and the like), and in this case, the first display region that affects displaying of the light field sub-image is distributed in multiple display regions of the display, for example, the first display region is distributed in at least two display regions (for example, at least two adjacent display regions) of the display. In the target pixel density distribution information, the target pixel density corresponding to the first display region may be large, and therefore, after the display is adjusted according to the target pixel density distribution information, the actual pixel density of the display corresponding to the first display region is large, that is, the first display region has more display pixels for displaying the light field sub-image information, thereby improving the spatial resolution of displaying content of the actually displayed light field display image corresponding to the first region of the image, to cause that the definition of the part of content is improved.

The acquisition manner of the first region of the image may be determined according to actual requirements, and is very flexible.

In an optional implementation manner, the first region of the image may be determined according to Region of Interest (ROI) information, that is, region of interest information is acquired; and the first region of the image is determined according to the region of interest information. The region of interest may comprise, but not limited to, one or more of the following: at least one region of the image selected by the user (that is, a user selected region of the image), at least one region of the image fixed by the user (that is, a user fixation region of the image), and a region of interest obtained by automatic detection on the image by the image display control apparatus. The solution determines the first region of the image according to the region of interest, and the determined first region may be a region corresponding to the region of interest, or the determined first region may be a region in the image and corresponding to a region of non-interest, to cause that the determination of the first region is more coincide with the actual user requirement, thereby better meeting the personalized application requirement of the user.

In another optional implementation manner, the first region of the image may be determined according to a result of image analysis, that is: perform image analysis on the image; and determine the first region of the image according to an analysis result on the image. For example, a human face recognition is performed on the to-be-displayed image, and a human face region is determined as the first region of the image according to a recognition result. For another example, a moving object recognition is performed on the to-be-displayed image, and a region corresponding to the moving object is determined as the first region of the image according to a recognition result. The solution can determine the first region according to the image analysis result of the to-be-displayed image, to cause that the determination of the first region is more intelligent, thereby improving the efficiency and universality of determining the first region.

Further, the first region may comprise one or more first sub-regions. The first sub-region comprises at least a part of region in the image whose display definition needs to be enhanced relative to a comparative display definition. In a case that the first region comprises multiple first sub-regions, the distribution of the multiple first sub-regions in the image may be successive, for example, the multiple first sub-regions have connection boundaries; or, the distribution of the multiple first sub-regions in the image may be discrete, for example, boundaries of the multiple first sub-regions are not connected, or the boundary of at least one of the first sub-regions in the multiple first sub-regions is not connected to boundaries of other first sub-regions. The display dentition of the first sub-region may be adjusted to be increased or reduced relative to the comparison display definition, which is not limited in the embodiment of the present application. The solution improves the flexibility of determining the first region in the image that needs to adjust the image display definition, so as to better meet diversified application requirements of users.

Moreover, in the case that the first region comprises multiple first sub-regions, the target pixel density of corresponding display region that affects displaying of the light field sub-image respectively corresponding to each first sub-region may be determined according to an actual requirement. The target pixel density distributions of different display regions that correspondingly affect displaying of light field sub-images respectively corresponding to different first sub-regions may be the same or different, which may be determined according to an actual requirement, and an implementation manner is very flexible. For example, the first region comprises a first sub-region A and a second sub-region B, respectively corresponding to light field sub-image information A' and a light field sub-image B', a display region that affects displaying of the light field sub-image information A' in the display is a display region A", and a display region that affects displaying of the light field sub-image information B' in the display is a display region B". In this case, in the determined target pixel density distribution information, the target pixel density corresponding to the display region A" and the target pixel density corresponding to the display region B' may be the same, and therefore, display definition of the multiple first sub-regions in the image may be adjusted to the same extent, to case that display definitions of content corresponding to various first sub-regions in the displayed light field image are the same or as close as possible. Or, in the determined target pixel density distribution information, the target pixel density corresponding to the display region A" and the target pixel density corresponding to the display region B" may be different, for example, although the target pixel densities all need to be increased relative to an original pixel density, they have different increment amplitudes, and therefore, display definitions of the multiple first sub-regions in the image may be adjusted to different extents, to cause that the display definitions of content corresponding to various first sub-regions in the displayed light field image are also differentiated in a certain extent.

In the embodiment of the present application, after the target pixel density distribution information is acquired, the pixel density distribution of the display may be adjusted according to the target pixel density distribution information. The adjustment manner on the pixel density distribution of the display may be selected according to actual requirements, which is not limited in the embodiment of the present application. In an optional implementation manner, deformation control information of a controllable deformation material part may be determined according to the target pixel density distribution information; and the controllable deformation material part is controlled according to the deformation control information to be deformed, so as to correspondingly adjust the display pixel density distribution of the display through the deformation of the controllable deformation material part. The solution adjusts the pixel distribution of the display by controlling the deformation of the controllable deformation material part, and the solution is simple and is easy to implement.

Figure 1B:
FIG. 1b is a schematic structural diagram of a first pixel density adjustable display according to an embodiment of the present application.

FIG. 1b is a schematic structural diagram of a pixel density adjustable display according to an embodiment of the present application. As shown in FIG. 1b, the pixel density adjustable display according to the embodiment of the present application comprises: multiple display pixels 11 and a controllable deformation material part 12. The display performs image display by using the display pixels 11, the multiple display pixels 11 are distributed in an array, and the controllable deformation material part 12 is respectively connected to the multiple display pixels 11. The controllable deformation material part 12 may deform under the action of an external field, ad density distribution of the multiple display pixels 11 is adjusted correspondingly through the deformation of the controllable deformation material part 12. The controllable deformation material part can be deformed by changing a certain external function factor (for example, an external field) applied thereon, and when the external field applied thereon is removed or changed, the deformation of the controllable deformation material part can be restored. The display pixel may comprise, but not limited to, at least one light emitting unit. The light emitting unit may comprise, but not limited to an LED light emitting unit and an OLED light emitting unit. A light emitting color of the light emitting unit may be determined according to an actual requirement, and the light emitting unit may comprise, but not limited to, one or more light emitting sub-units; the light emitting sub-unit may comprise an LED light emitting sub-unit and an OLED light emitting sub-unit. The multiple light emitting sub-units may comprise, but not limited to, LED light emitting sub-units and OLED light emitting sub-units having different colors such as red (R), green (G) and blue (B).

In the multiple display pixels distributed in an array and comprised in the display according to the embodiment of the present application, each display pixel and the controllable deformation material part may be closely connected by using, but not limited to, a manner such as adhering. In this way, when the controllable deformation material part is deformed, pitches between the display pixels are adjusted correspondingly, thereby changing the density distribution of the display pixels, and achieving the effect of differentiating the display pixel density distribution for different regions of the display according to an actual requirement.

In a process of actually applying the technical solution provided in the embodiment of the present application, the external field non-uniformly distributed may be applied to different regions of the controllable deformation material part, to case that the different partial regions of the controllable deformation material part have deformations of different extents, thereby adjusting the overall density distribution of the display pixels. Optionally, the external field may be applied to regions of the controllable deformation material part that are not overlapped with multiple display pixels, to cause that the regions of the controllable deformation material pat overlapping with the display pixels are not deformed, but the density distribution of the display pixels are changed by deformation of other parts of the controllable deformation material part. The solution is conducive to prevent the deformation of the controllable deformation material part from damaging the display pixels.

Further, the controllable deformation material part may be prepared by selecting at least one suitable controllable deformation material as desired, to cause that the controllable deformation material part has properties of deformable and restorable deformation. The optional controllable deformation material part is at least made of one or more of the following controllable deformation materials: a piezoelectric material, an electroactive polymer, a photoinduced deformation material, and a magnetostrictive material.

The piezoelectric material may have mechanical deformation under the action of an electric field. The controllable deformation material part prepared by using the piezoelectric material is referred to as a piezoelectric material part. By using this physical property of the piezoelectric material, the embodiment of the present application may, but not limited to, determine, according to the target pixel density distribution information, electric field control information required by enabling the piezoelectric material part to have corresponding mechanical deformation, the electric field applied to the piezoelectric material part is controlled according to the electric field control information, to cause that the piezoelectric material part has corresponding mechanical deformation. The pixel density distribution of the display is adjusted correspondingly through the mechanical deformation of the piezoelectric material part, thereby achieving the objective of adjusting the display pixel density distribution of the display according to the target pixel density distribution information. The piezoelectric material may comprise, but is not limited to, one of the following, piezoelectric ceramic, and a piezoelectric crystal. The solution can adjust the pixel density distribution of the display by fully using the physical property of the piezoelectric material.

The electroactive polymers (EAP) are a type of polymer materials that can change the shape or size thereof under the action of an electric field. The controllable deformation material part prepared by using the electroactive polymers is referred to as an electroactive polymer part. By using this physical property of the electroactive polymer, the embodiment of the present application may, but not limited to, determine, according to the target pixel density distribution information, electric field control information required by enabling the electroactive polymer part to have corresponding mechanical deformation, the electric field applied to the electroactive polymer part is controlled according to the electric field control information, to cause that the electroactive polymer part has corresponding mechanical deformation. The pixel density distribution of the display is adjusted correspondingly through the deformation of the electroactive polymer part, thereby achieving the objective of adjusting the display pixel density distribution of the display according to the target pixel density distribution information. The electroactive polymers may comprise, but are not limited to, at least one of the following: electron-type electroactive polymers and ion-type electroactive polymers. The electron-type electroactive polymers may comprise at least one of the following: ferroelectric polymers (such as polyvinylidene fluoride), electrostrictive grafted elastomers, and liquid crystalline elastomers. The ion-type electroactive polymers comprise at least one of the following: the electrorheological fluid, Ionic polymer-metal composite, and the like. The solution can adjust the pixel density distribution of the display by fully using the physical property of the electroactive polymers.

The photoinduced deformation material is a type of polymer material that can change the shape or size thereof under the action of a light field. The controllable deformation material part prepared by using the photoinduced deformation material is referred to as a photoinduced deformation material part. By using such a physical property of the photoinduced deformation material, the embodiment of the present application can, but not limited to, determine, according to the target pixel density distribution information, light field control information required by corresponding deformation of the photoinduced deformation material part, and the light field applied to the photoinduced deformation material part is controlled according to the light field control information, to cause that the photoinduced deformation material part to deform correspondingly. The pixel density distribution of the display is adjusted correspondingly through the deformation of the photoinduced deformation material part, thereby achieving the objective of adjusting the display pixel density distribution of the display according to the target pixel density distribution information. The photoinduced deformation material may comprise, but not limited to, at least one of the following: photostrictive ferroelectric ceramics and photoinduced deformation polymers. The photostrictive ferroelectric ceramics comprise, but not limited to, lead lanthanum zirconate titanate (PLZT) ceramics, and the photoinduced deformation polymers comprise, but not limited to, photoinduced deformation liquid crystalline elastomers. The solution can adjust the pixel density distribution of the display by fully using the physical property of the photoinduced deformation material.

The magnetostrictive material is a type of magnetic material that can change the magnetization state thereof under the action of a magnetic field thereby changing the size thereof. The controllable deformation material part prepared by using the magnetostrictive material is referred to as a magnetostrictive material part. By using such a physical property of the magnetostrictive material, the embodiment of the present application can, but not limited to, determine, according to the target pixel density distribution information, magnetic field control information required by corresponding deformation of the magnetostrictive material, and the magnetic field applied to the magnetostrictive material part is controlled according to the magnetic field control information, to cause that the magnetostrictive material part to deform correspondingly. The pixel density distribution of the display is adjusted correspondingly through the deformation of the magnetostrictive material part, thereby achieving the objective of adjusting the display pixel density distribution of the display according to the target pixel density distribution information. The magnetostrictive material may comprise, but not limited to, rare-earth giant magnetostrictive material, such as an alloy material $Tbo_{0.3}Dy_{0.7}Fe_{1.95}$ using $(Tb,Dy)Fe_2$ compound as a substrate. The solution can adjust the pixel density distribution of the display by fully using the physical property of the magnetostrictive material.

In the technical solution provided in the embodiment of the present application, specific structures and connection manners of the display pixels and the controllable deformation material part can be determined according to actual requirements, and an actual manner is very flexible.

In an optional implementation manner, as shown in FIG. 1b, the controllable deformation material part 12 comprises: a controllable deformation material layer 121, and the multiple display pixels 11 are distributed in an array and connected to one surface of the controllable deformation material layer 121. Optionally, it may be selected according to an actual process condition to directly form the multiple display pixels on the controllable deformation material layer 121, or the multiple display pixels and the controllable deformation material layer 121 may be prepared respectively, and the two may be closely connected by using, but not limited to, adhering. The solution is simple in structure and easy to implement.

Figure 1C:
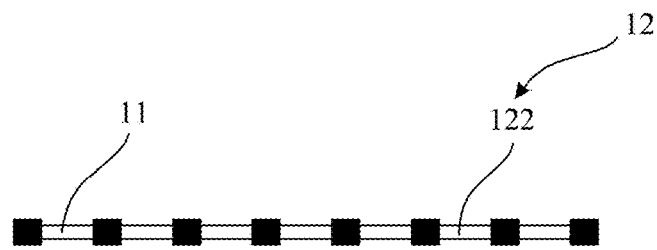
FIG. 1c is a schematic structural diagram of a second pixel density adjustable display according to an embodiment of the present application.

In another optional implementation manner, as shown in FIG. 1c, the controllable deformation material part 12 comprises multiple controllable deformation material connecting sub-parts 122, the controllable deformation material connecting sub-parts 122 are distributed in an array to correspondingly connect the multiple display pixels 11 distributed in an array, that is, the multiple display pixels distributed in an array are connected into one piece by using the multiple controllable deformation material connecting sub-parts distributed in an array. Optionally, the multiple controllable deformation material connecting sub-parts may be formed at interval regions of pixels of the display pixel array according to an actual process, and the multiple controllable deformation material connecting sub-parts and the corresponding display pixels may be connected by using, but not limited to, abutting, adhering, and the like. The density distribution of the display pixels may be adjusted by controlling the deformation of the multiple controllable deformation material connecting sub-parts, and the structure is simple and easy to implement.

Figure 1D:
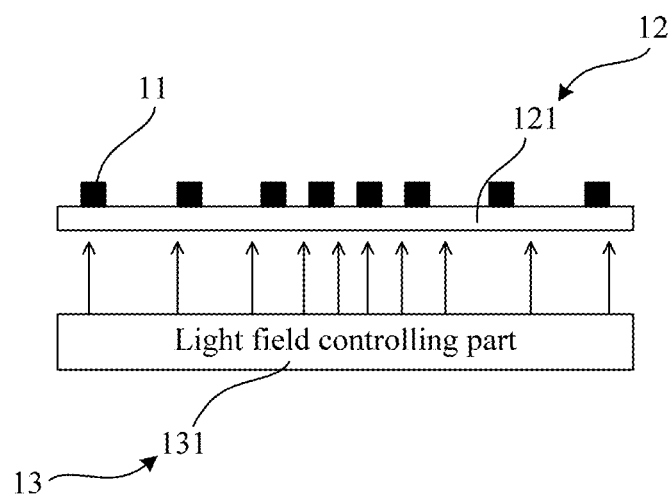
FIG. 1d is a schematic structural diagram of a third pixel density adjustable display according to an embodiment of the present application.
Figure 1E:
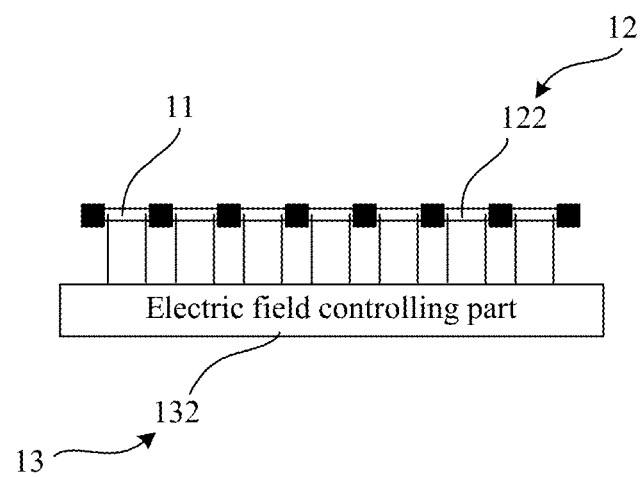
FIG. 1e is a schematic structural diagram of a fourth pixel density adjustable display according to an embodiment of the present application.

Further, as shown in FIG. 1d and FIG. 1e, the display may further comprise: a deformation controlling part 13, and the deformation controlling part 13 is configured to adjust distribution of the external field that is applied to the controllable deformation material part 12, so as to control the controllable deformation material part 12 to deform. In this way, when the controllable deformation material part 12 deforms, pitches between the display pixels 11 are adjusted correspondingly, thereby changing the density distribution of the display pixels 11, and achieving the effect of differentiating the display pixel density distribution for different regions of the display according to actual requirements.

Optionally, as shown in FIG. 1d, the deformation controlling part may comprise a light field controlling part 131, and the light field controlling part 131 is configured to adjust distribution of an external light field that is applied to the controllable deformation material part 12, so as to control the controllable deformation material part 12 to deform correspondingly. In this case, the controllable deformation material part 12 may comprise a photoinduced deformation material part prepared at least by using a photoinduced deformation material, for example, the photoinduced deformation material part may comprise a photoinduced deformation material layer prepared at least by using the photoinduced deformation material, or the photoinduced deformation material part may comprise multiple photoinduced deformation material connecting sub-parts prepared at least by using the photoinduced deformation material. The light field controlling part 131 changes the light field distribution applied to the photoinduced deformation material part (different densities of arrows in FIG. 1d represent a light field of the controllable deformation material part 12 distributed in different intensities), so as to excite different regions of the controllable deformation material part 12 to deform to different extents; moreover, the pitches between the display pixels 11 are correspondingly changed through the deformation of the controllable deformation material part 12, thereby changing the density distribution of the display pixels 11, and achieving the effect of differentiating the display pixel density distribution for different regions of the display according to actual requirements.

Figure 1F:
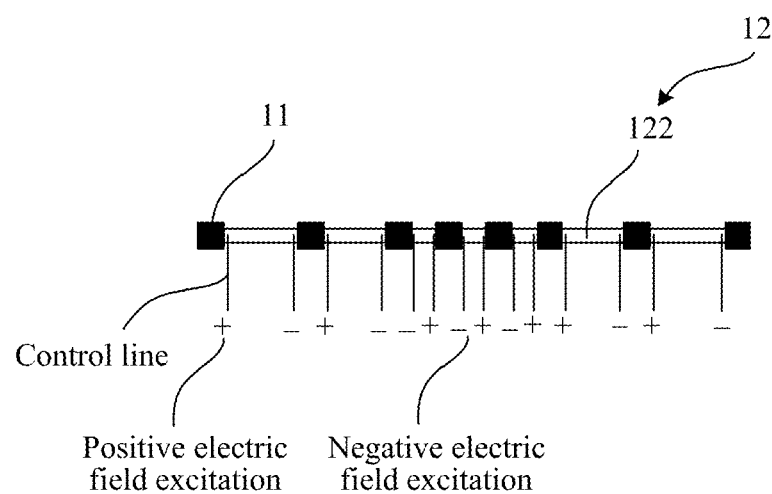
FIG. 1f is an example of a scenario of performing pixel density adjustment by a display in a case of non-uniform light field excitation according to an embodiment of the present application.

Optionally, as shown in FIG. 1e, the deformation controlling part may comprise an electric field controlling part 132, and the electric field controlling part 132 is configured to adjust distribution of an external electric field that is applied to the controllable deformation material part, so as to control the controllable deformation material part to deform correspondingly. In this case, the controllable deformation material part 12 may comprise a piezoelectric material part (such as a piezoelectric material layer or a piezoelectric material connecting sub-part) at least prepared by the piezoelectric material, or, the controllable deformation material part 12 may comprise an electroactive polymer part (such as an electroactive polymer layer or an electroactive polymer connecting sub-part) at least prepared by the electroactive polymers. As shown in FIG. 1e, the electric field control part and the controllable deformation material may be connected by using a control line, and the electric field control part 132 changes the electric field distribution applied to the controllable deformation material part, so as to excite different regions of the controllable deformation material part 12 to deform to different extents. If the electric field applied to the controllable deformation material part 12 is a zero electric field, the controllable deformation material part does not deform (which is referred to as zero electric field excitation); if the intensity distribution of the electric field applied to the controllable deformation material part 12 is changed ("+" positive electric field excitation and "−" negative electric field excitation as shown in the drawing), the electric field intensities applied to different regions of the controllable deformation material part have a difference, as shown in FIG. 1f, and in this way, different regions of the controllable deformation material part may deform to different extents, and pitches between the display pixels 11 are adjusted correspondingly through the deformation of the controllable deformation material part 12, thereby changing the overall pixel density distribution of the display, and achieving the effect of differentiating the display pixel density distribution for different regions of the display according to actual requirements.

In the embodiment of the present application, the controllable deformation part and the deformation controlling part may be connected directly or indirectly. The deformation controlling part may be used as a part of the display, or the deformation controlling part may not be used as a part of the display, and the display may be connected to the deformation controlling part by using a manner such as a reserved pin and an interface. The external field applied to the controllable deformation material part may comprise, but not limited to, an electric field, a magnetic field, a light field, and the like. Hardware and software structures that are used to generate the electric field, hardware and software structures that are used to generate the magnetic field, and hardware and software structures that are used to generate the light field may be implemented by using corresponding prior arts according to actual requirements, which are not repeated in the embodiment of the present application.

Figure 1G:
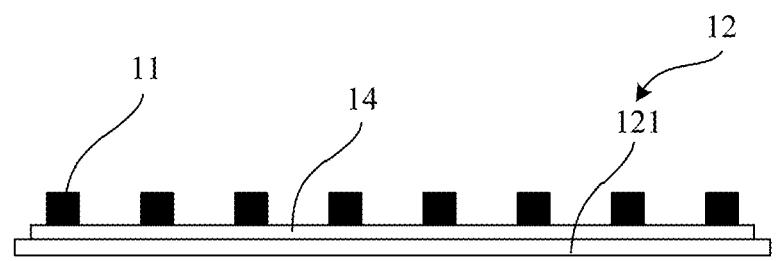
FIG. 1g is a schematic structural diagram of a fifth pixel density adjustable display according to an embodiment of the present application.
Figure 1H:
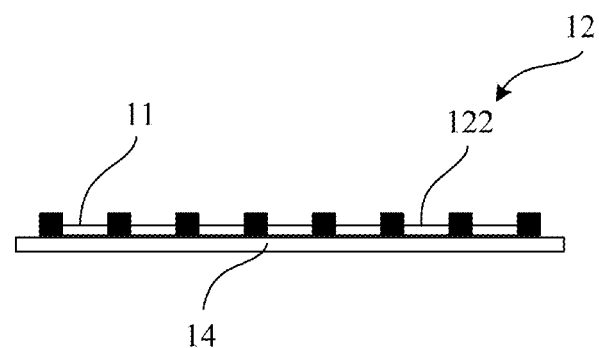
FIG. 1h is a schematic structural diagram of a sixth pixel density adjustable display according to an embodiment of the present application.

Optionally, the display may further comprise a flexible substrate, and the flexible substrate may comprise, but not limited to, a flexible plastic substrate, which has a certain flexibility, and the shape of the flexible substrate may be changed as required. The display pixels and the controllable deformation material part may be disposed at the same side or different sides of the flexible substrate. For example, as shown in FIG. 1g, the multiple display pixels 11 are connected to one surface of a flexible substrate 14, and the controllable deformation material part (for example, the controllable deformation material layer 121) is connected to the other surface of the flexible substrate 14. For another example, as shown in FIG. 1h, the multiple display pixels 11 are connected to one surface of a flexible substrate 14, and the controllable deformation material part (for example, the controllable deformation material connecting sub-part 122) is connected to the corresponding display pixels and is located at the surface of the flexible substrate 14 the same as the display pixels 11. The solution can not only control the controllable deformation material part to deform by using the external field applied thereto, so as to indirectly adjust the overall pixel density distribution of the display, thereby implementing the adjustable pixel density of the display, and can also change the shape of the display because of the use of the flexible substrate, so as obtain a curved display by bending the planar display by a certain angle, thereby meeting diversified application requirements of image display, decoration and the like.

Figure 1I:
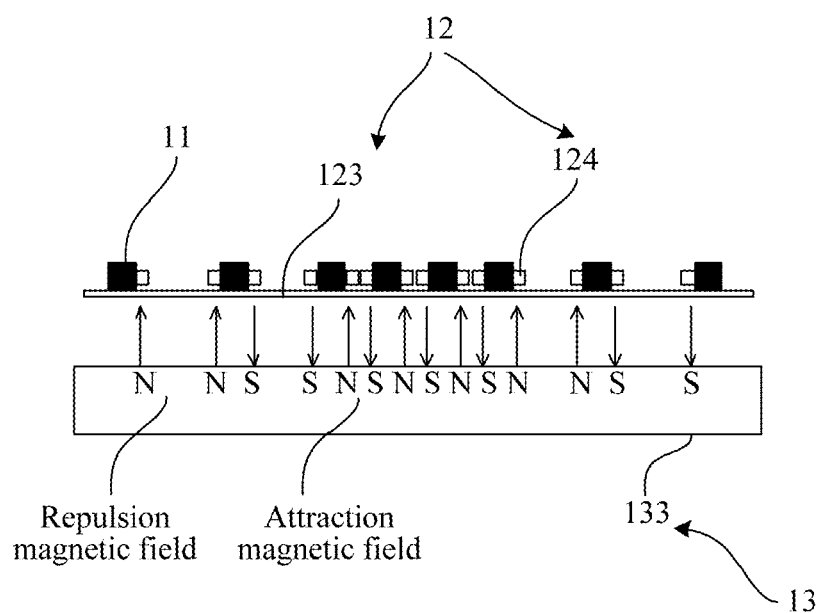
FIG. 1i is a schematic structural diagram of a seventh pixel density adjustable display according to an embodiment of the present application.

FIG. 1*i* is a schematic structural diagram of a seventh pixel density adjustable display according to an embodiment of the present application. In the display shown in FIG. 1*i*, the controllable deformation material part 12 comprises: a flexible substrate 123 and multiple magnetic conductive material parts 124. The multiple display pixels 11 are respectively connected to the flexible substrate 123, and at least a part of the display pixels 11 are connected to multiple magnetic conductive material parts 124. By changing a magnetic field applied to the magnetic conductive material part 124, the flexible substrate 123 is deformed correspondingly, and the density distribution of the multiple display pixels 11 are adjusted correspondingly through the deformation. For example, a magnetic conductive material part 124 may be set on one side surface of each display pixel. Optically, the display pixels 11 are respectively adhered to the flexible substrate 123 and the magnetic conductive material part 124. The magnetic conductive material part may comprise a magnetic pole prepared by using the magnetic conductive material, and the magnetic conductive material may use, but not limited to, one or more of a soft magnetic material, a silicon steel sheet, an permalloy, a ferrite, an amorphous soft magnetic alloy, a super-microcrystalline soft magnetic alloy, and the like. The magnetic conductive material part prepared by using the soft magnetic material has a desirable magnetic conduction performance, and the residual magnetism after the magnetic field is removed is very small to be conducive to the next adjustment.

Further, optionally, the deformation controlling part 13 of the embodiment of the present application may further comprise a magnetic field controlling part 133, and the magnetic field controlling part 133 is configured to adjust distribution of an external magnetic electric field that is applied to the controllable deformation material part, so as to control the controllable deformation material part to deform correspondingly. For example, when the magnetic field controlling part 133 controls the magnetic field (that is, an excitation magnetic field) applied to the magnetic conductive material part 124 to change, as shown in FIG. 1*i*, an identical magnetic poles (NN or SS) repulsion magnetic field or a different magnetic poles (NS or SN) attraction magnetic field having a certain magnetic field intensity distribution is applied between the adjacent display pixels, a repulsion force or attraction force may be generated between the magnetic poles, and the magnetic force is transmitted to the flexible substrate 123 to cause the flexible substrate 123 to deform, such as stretch, thereby causing the pitches between the corresponding display pixels to be changed, and implementing the objective of adjusting the display pixel density distribution. The solution implements adjustable pixel density distribution on the display in combination with the deformation property such as stretchable of the flexible substrate and the magnetic field control principle.

Figure 1J:
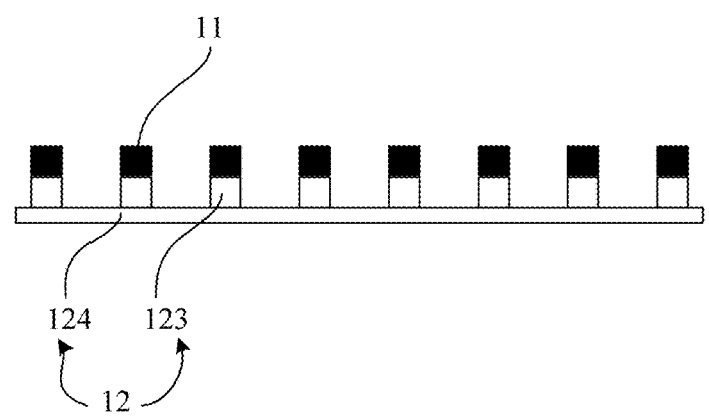
FIG. 1j is a schematic structural diagram of an eighth pixel density adjustable display according to an embodiment of the present application.

FIG. 1*j* is a schematic structural diagram of an eighth pixel density adjustable display according to an embodiment of the present application. In the display shown in FIG. 1*j*, the controllable deformation material part 12 comprises; a flexible substrate 123 and multiple magnetic conductive material parts 124. One side of each of the magnetic conductive material parts 124 is connected to the flexible substrate 123, and the opposite side of the magnetic conductive material part 124 is correspondingly connected to multiple display pixels 11, and by changing the magnetic field applied to the magnetic conductive material part 124, the flexible substrate 123 is deformed correspondingly, and the density distribution of the multiple display pixels 11 is adjusted correspondingly through the deformation. Optionally, the magnetic conductive material part 124 is adhered to the flexible substrate 123, the display pixels 11 are adhered to the magnetic conductive material part 124, and when the magnetic field applied to the magnetic conductive material part 124 is changed, the magnetic force is transmitted to the flexible substrate 123 to cause the flexible substrate 123 to be deformed, such as stretched, thereby implementing the objective of adjusting the display pixel density distribution. The solution implements adjustable pixel density distribution on the display in combination with the deformation property such as stretchable of the flexible substrate and the magnetic field control principle.

The technical solution provided in the embodiment of the present application may implement adjustable pixel density of the display, and implement image display based on the pixel density adjustable display, so as to fully use the overall pixels of the display to present display definitions of different regions of an image in a differentiated manner, thereby improving the actual utilization of the display pixels, and being conducive to satisfying diversified application requirements of users. The pixel density adjustable display may be applicable to a device having an image display function, for example, may be applicable to, but not limited to, the following devices: a television, a computer, a camera, a mobile phone, a video camera, and the like.

A person skilled in the art should understand that in any of the above methods of the specific implementation manner of the present application, serial numbers of steps do not indicate priorities of execution sequences, the execution sequences of the steps should be determined according to functions and inner logic thereof, and should not constitute a limitation to implementation processes of the specific implementation manner of the present application.

Optionally, the light field display control method further comprises: performing a balanced control on display brightness of different display regions of the display in a process that the light field display device after the adjustment displays the light field image undergone the sampling processing. The display pixel density distribution of the display of the light field display device is adjusted, the distribution of the display pixels of the display after the adjustment is non-uniform, and a part of display pixels have a large density and a part of display pixels have a small density, the brightness of the image content part presented to the user by the display region having the large display pixel density by using the corresponding lenslet may be large, and the brightness of the image content part presented to the user by the display region having the small display pixel density by using the corresponding lenslet may be small, which causes that the overall brightness distribution of the light field image may be unbalanced. If the display effect of unbalanced brightness distribution is a display effect wanted by the user, or the user does not care about the display effect of unbalanced brightness distribution, or the like, the balanced control on the brightness may not be performed. Otherwise, in a process that the light field display device after the adjustment displays the light field image undergone the sampling processing, balanced control is performed on display brightness of different display regions of the display. For example, the brightness of the display region having the large display pixel density is appropriately reduced, and/or the brightness of the display region having the small display pixel density is appropriately increased, so as to reduce the brightness difference of different parts of the actually displayed light field image, thereby improving the viewing effect and the user experience.

A person skilled in the art should understand that in any of the above methods of the specific implementation manner of the present application, serial numbers of steps do not indicate priorities of execution sequences, the execution sequences of the steps should be determined according to functions and inner logic thereof, and should not constitute a limitation to implementation processes of the specific implementation manner of the present application.

Figure 5:
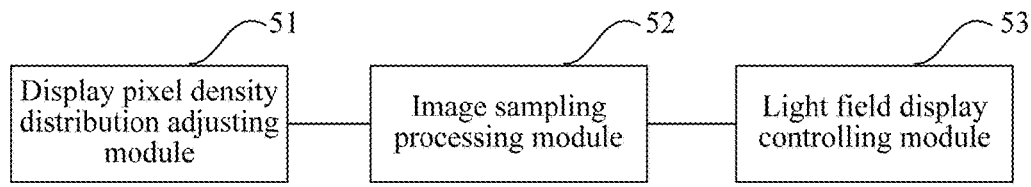
FIG. 5 is a logic block diagram of a first light field display control apparatus according to an embodiment of the present application.

FIG. 5 is a logic block diagram of a first light field display control apparatus according to an embodiment of the present application. As shown in FIG. 5, the light field display control apparatus provided in the embodiment of the present application may comprise: a display pixel density distribution adjusting module 51, an image sampling processing module 52, and a light field display controlling module 53.

The display pixel density distribution adjusting module 51 is configured to adjust display pixel density distribution of a display of a light field display device.

The image sampling processing module 52 is configured to perform sampling processing on a light field image according to actual location information of display pixels of the display after the adjustment.

The light field display controlling module 53 is configured to display, by the light field display device after the adjustment, the light field image undergone the sampling processing.

The technical solution provided in the embodiments of the present application can present differential spatial resolution of different regions of a light field display image by fully using pixels of a display of a light field display device. Specifically, the display pixel density distribution of the display of the light field display device is adjusted, for example, from original uniform distribution of display pixels to adjusted non-uniform distribution, such that the adjusted display pixels of the display assume non-uniform differentiated distribution, for example, the display pixel density of a local region of the display is large and the display pixel density of another local region is small; after that, sampling processing is performed on a to-be-displayed light field image according to actual locations of the display pixels of the display, such that the light field image undergone the sampling processing is corresponding to the actual locations of the display pixels of the display; and finally, the adjusted display displays the light field image undergone the sampling processing, and in this way, a lenslet array of the light field display device is used to view the light field image undergone the sampling processing and displayed by the display, so as to obtain the displayed light field image having differentiated distribution of definition, for example, a spatial resolution of an image part displayed by a display region of the display having a large display pixel density is greater than a spatial resolution of an image part displayed by a display region of the display having a small display pixel density, and therefore, requirements of a user on differentiated display of local definition of an image may be met by fully using existing pixels of the display.

Figure 6:
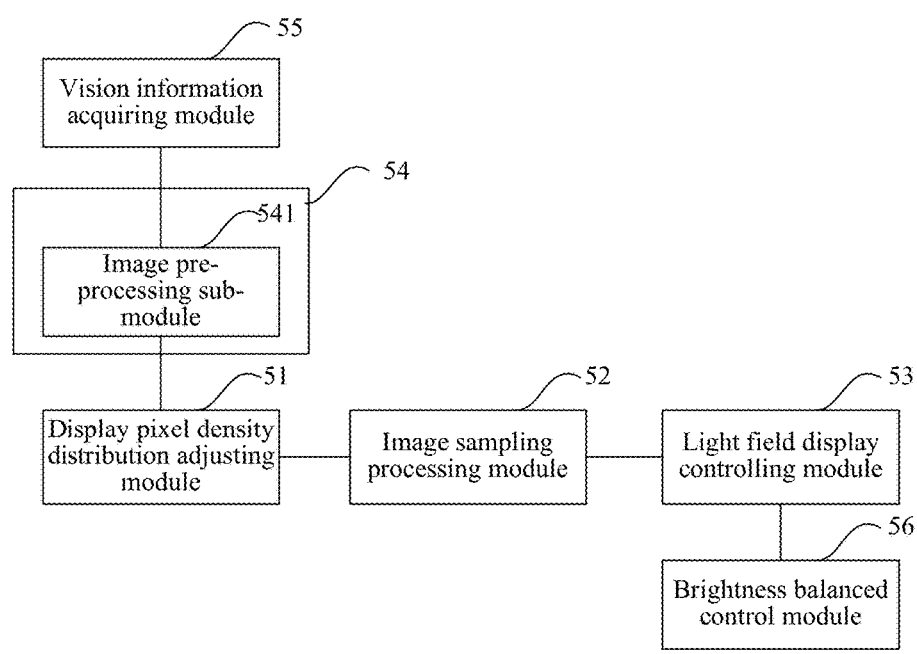
FIG. 6 is a logic block diagram of a second light field display control apparatus according to an embodiment of the present application.

Optionally, as shown in FIG. 6, the light field display control apparatus provided in the embodiment of the present application may further comprise: an image pre-processing module 54, and the image pre-processing module 54 is configured to pre-process an image to obtain a light field image corresponding to the image. The solution performs pre-processing on the image content, and converts the image into a light field image displayed by substantially restoring the content by using the light field display device according to the reversibility principle of an optical path, thereby meeting light field display application requirements of most images, and improving the universality of the solution.

Optionally, the image pre-processing module 54 comprises: an image pre-processing sub-module 541, and the image preprocessing sub-module 541 is configured to pre-process the image according to vision information of a user to obtain the light field image. The solution can not only be applied to pre-processing scenario a light field image corresponding to the image viewed by a user having normal relative vision, and can also be applied to pre-processing of a light field image corresponding to the image viewed by a user having relative vision that needs to be corrected (such as far-sighted or short-sighted), and the implementation manner thereof is flexible.

Optionally, the light field display control apparatus provided in the embodiment of the present application may further comprise: a vision information acquiring module 55, and the vision information acquiring module 55 is configured to acquire the vision information of the user. The vision information may be acquired at once, and may also be acquired dynamically in a process of image displaying, so as to implement dynamic adjustment of a processing result by tracking eyes of the user, to cause that the light field image displayed when the eye viewing position of the user is changed is a certain focal point aligned image relative to the current viewing position of the user, thereby improving the viewing effect and improving the user experience.

Optionally, the light field display control apparatus provided in the embodiment of the present application may further comprise: a brightness balanced control module 56. The brightness balanced control module 56 is configured to perform a balanced control on display brightness of different display regions of the display in a process that the light field display device after the adjustment displays the light field image undergone the sampling processing. The solution can reduce the brightness difference of different parts of the actually displayed light field image, thereby improving the viewing effect and the user experience.

Figure 7:
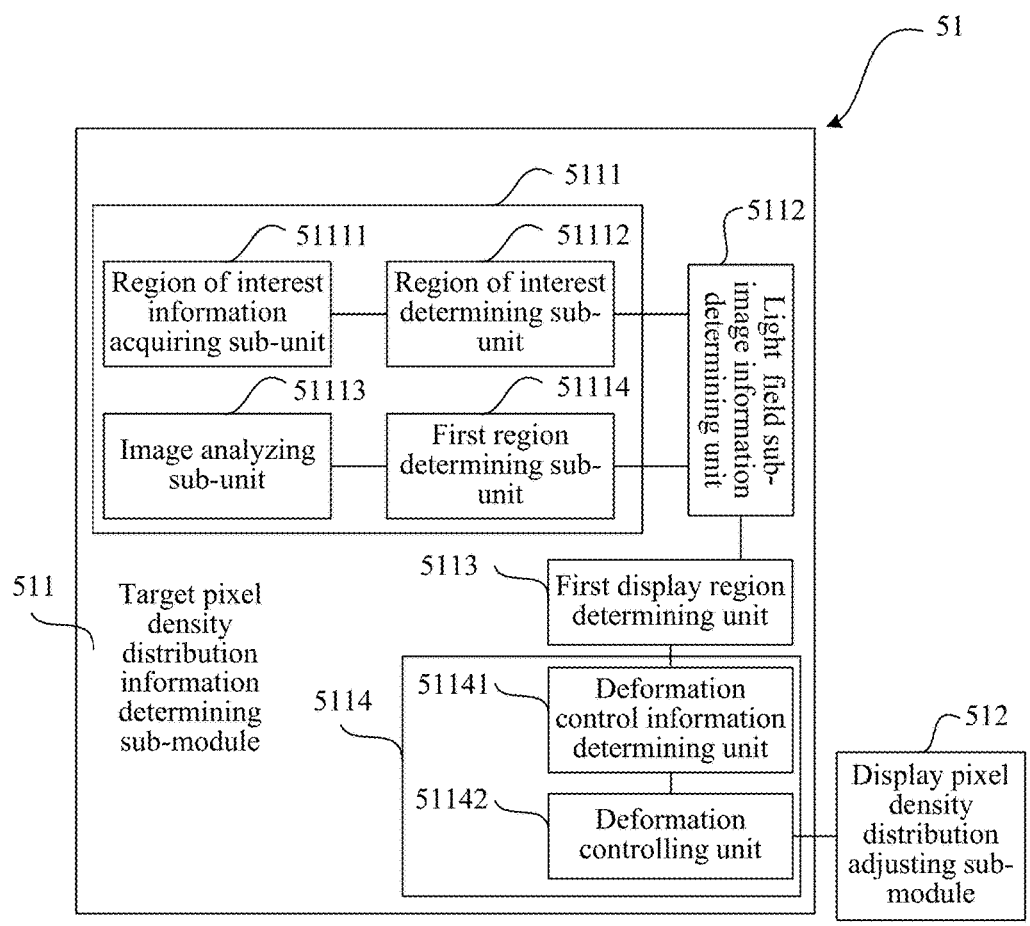
FIG. 7 is a logic block diagram of a display pixel density distribution adjusting module according to an embodiment of the present application.

Optionally, as shown in FIG. 7, the display pixel density distribution adjusting module 51 comprises: a target pixel density distribution information determining sub-module 511 and a display pixel density distribution adjusting sub-module 512. The target pixel density distribution information determining sub-module 5111 is configured to determine target pixel density distribution information; and the display pixel density distribution adjusting sub-module 512 is configured to adjust the display pixel density distribution of the display according to the target pixel density distribution information, to cause that at least two display regions in the display after the adjustment have different display pixel densities. The solution can perform redistribution adjustment on the display pixels of the display based on the target pixel density distribution information, so as to present the spatial resolutions of the light field display image in a differentiated manner.

Optionally, the target pixel density distribution information determining sub-module 511 comprises: a first region determining unit 5111, a light field sub-image information determining unit 5112, a first display region determining unit 5113, and a target pixel density distribution information determining unit 5114. The first region determining unit 5111 is configured to determine a first region of the image; the light field sub-image information determining unit 5112 is configured to determine light field sub-image information corresponding to the first region in the light field image; the first display region determining unit 5113 is configured to determine a first display region in the display that affects displaying of the light field sub-image information; and the target pixel density distribution information determining unit 5114 is configured to determine the target pixel density distribution information according to the first display region, wherein in the target pixel density distribution information, the target pixel density corresponding to the first display region is different from the target pixel density corresponding to a second display region, and the second display region is at least a part of display region of the display other than the first display region. The solution can fully use the existing display pixels of the display, readjusts the density distribution thereof, so as to present a display effect of displaying spatial resolutions of the light field image in a differentiated manner, thereby improving the actual utilization of the display pixels, and better meeting diversified actual application requirements of the users.

Or, optionally, the target pixel density distribution information determining sub-module comprises: a first region determining unit, configured to determine a first region of the image; a first display region determining unit, configured to determine a first display region of the display according to relative location information of pixels in the first region relative to a reference point of the image; and a target pixel density distribution information determining unit, configured to determine the target pixel density distribution information according to the first display region, wherein in the target pixel density distribution information, the target pixel density corresponding to the first display region is different from the target pixel density corresponding to a second display region, and the second display region is at least a part of display region of the display other than the first display region. By using the solution, the region that affects displaying of the light field sub-image corresponding to the first region may be determined, and the implementation solution is simple.

Optionally, the display comprises display regions respectively corresponding to lenslets in the lenslet array of the light field display device, and the first display region is distributed and the first display region is distributed in at least one of the display regions. For example, the first display region is distributed in one display region of the display, or the first display region is distributed in at least two of the display regions, or the like. The solution can use the regions in the display that affect displaying of the light field sub-image information as display regions whose pixel density is to be adjusted (that is, the first display region), thereby improving the correctness of determining the display region whose pixel density is to be adjusted.

Optionally, the first determining unit 5111 comprises: a region of interest information acquiring sub-unit 51111 and a region of interest determining sub-unit 51112. The region of interest information acquiring sub-unit 51111 is configured to acquire region of interest information; and the region of interest determining sub-module 722 is configured to determine the first region of the source image according to the region of interest information. The solution enables the determination of the first region to be more coincide with the actual user requirement, and can better meet a personalized application requirement of the user.

Optionally, the first region determining unit 5111 comprises: an image analyzing sub-unit 51113 and a first region determining sub-unit 51114. The image analyzing sub-unit 51113 is configured to perform image analysis on the image; and the first region determining sub-unit 51114 is configured to determine the first region of the image according to a result of the image analysis. The solution enables the determination of the first region to be more intelligent, thereby improving the efficiency and universality of determining the first region.

Optionally, the target pixel density distribution information determining sub-module 5114 comprises: a deformation control information determining unit 51141 and a deformation controlling unit 51142. The deformation control information determining unit 51141 is configured to determine deformation control information of a controllable deformation material part according to the target pixel density distribution information; and the deformation controlling unit 51142 is configured to control, according to the deformation control information, the controllable deformation material part to deform, so as to adjust the display pixel density distribution of the display correspondingly through the deformation of the controllable deformation material part. The controllable deformation material part can be deformed by changing a certain external function factor (for example, an external field) applied thereon, and when the external field applied thereon is removed or changed, the deformation of the controllable deformation material part can be restored. The optional controllable deformation material part is at least made of one or more of the following controllable deformation materials: a piezoelectric material, an electroactive polymer, a photoinduced deformation material, and a magnetostrictive material. The solution adjusts the pixel distribution of the display by controlling the deformation of the controllable deformation material part, and the solution is simple and is easy to implement.

Figure 8:
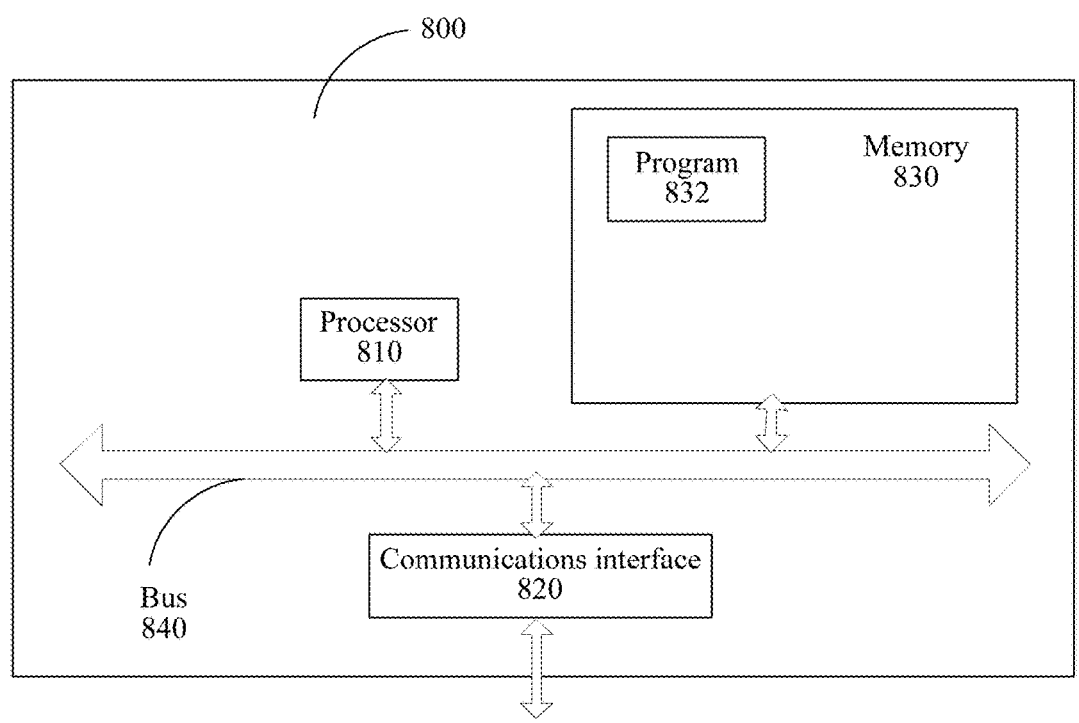
FIG. 8 is a logic block diagram of a third light field display control apparatus according to an embodiment of the present application.

FIG. 8 is a structural block diagram of a third light field display control apparatus according to an embodiment of the present application, and a specific implementation manner of a light field display control apparatus 800 is not limited in the specific embodiment of the present application. As shown in FIG. 8, the light field display control apparatus 800 may comprise:

a processor 810, a communications interface 820, a memory 830, and a communications bus 840, where:

The processor 810, the communications interface 820, and the memory 830 communicate with each other through the communications bus 840.

The communications interface 820 is configured to communicate with, for example, a device having a communication function, an external light source, and the like.

The processor 810 is configured to execute a program 832, and specifically may execute relevant steps in any embodiment of the light field display control method.

For example, the program 832 may comprise a program code. The program code comprises a computer operating instruction.

The processor 810 may be a central processing unit (CPU) or an Application Specific Integrated Circuit (ASIC), or be configured to be one or more integrated circuits configured to implement the embodiments of the present application.

The memory 830 is configured to store the program 832. The memory 830 may comprise a Random Access Memory (RAM) and may also further comprise a non-volatile memory, for example, at least one magnetic disk memory.

For example, in an optional implementation manner, the processor 810 may execute the program 832 to execute the following steps: adjusting display pixel density distribution of a display of a light field display device; performing sampling processing on a light field image according to actual location information of display pixels of the display after the adjustment; and displaying, by the light field display device after the adjustment, the light field image undergone the sampling processing.

In other optional implementation manner, the processor 810 may further execute the program 832 to execute steps mentioned in any other embodiment, which is not repeated herein.

Specific implementations of all steps in the program 832 may be referred to in the corresponding descriptions of the corresponding steps, modules, sub-modules or units in the above embodiments, and are not repeated herein. It can be clearly understood by persons skilled in the art that, for the purpose of convenient and brief description, for a detailed working process of the described devices and modules, reference may be made to the corresponding process in the foregoing method embodiment, and the details will not be described herein again.

An embodiment of the present application further provides a light field display device, comprising: a display, a lenslet array, and a light field display control apparatus. The light field display control apparatus may be any light field display control apparatus provided in the embodiments of the present application, and can perform display control on an image by executing any light field display control method provided in the embodiments of the present application in a process involving an application comprising, but not limited to, image presentation and video playback. The presentation form of the device of the light field display control apparatus is not limited, for example, the light field display control apparatus may be a certain independent component, and the component cooperatively communicates with a light field display device comprising a display; or the light field display control apparatus may be integrated in a display device comprising a display as a certain functional module, and the light field display device may comprise, but not limited to, a device having a light field display capability and comprising the display, such as a television, a computer, a camera, a mobile phone, and a video recorder.

In addition to the light field display control apparatus, specific structures of components required by light field display and comprised in the light field display device are not limited, may be a light field display device for certain near-field or remote-field display, and according to a specific form of the light field display device, may be, for example, a wearable near-field display device, a naked eye visible remote-field display device, or the like, which are not limited in the embodiment of the present application.

Figure 9:
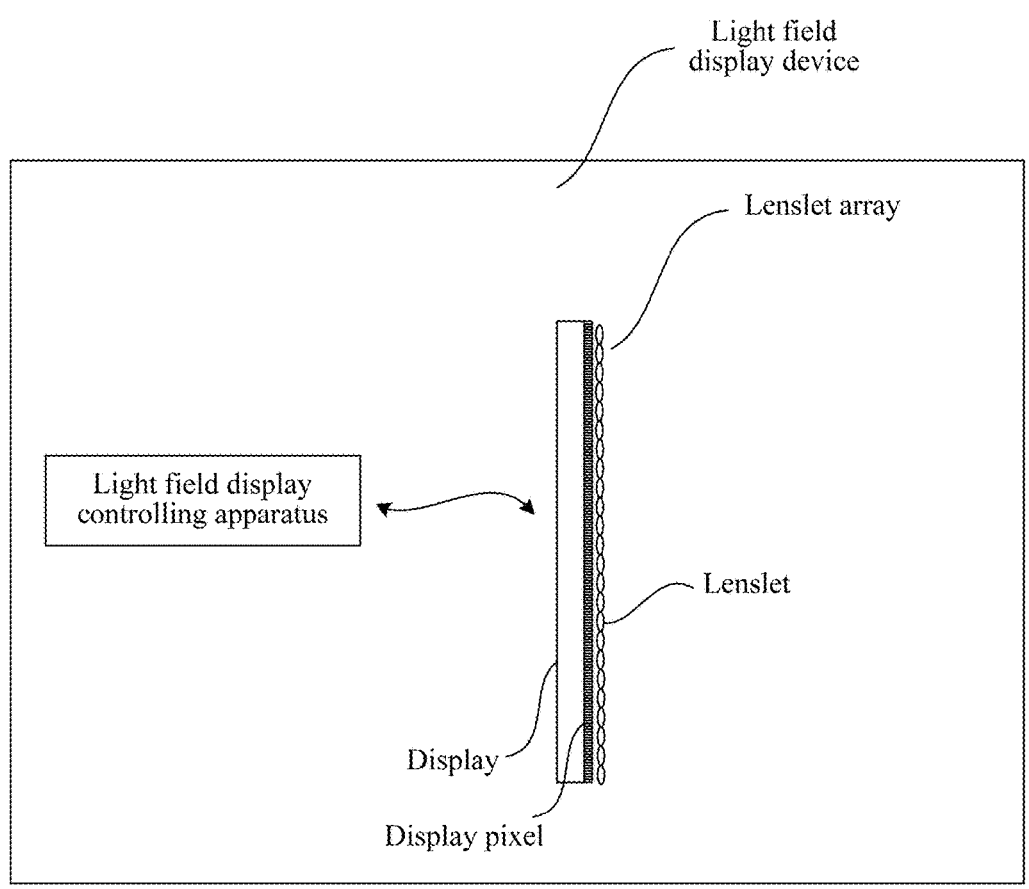
FIG. 9 is a schematic structural diagram of a light field display device according to an embodiment of the present application.

Optionally, as shown in FIG. 9, the display of the light field display device comprises multiple display regions, and one of the display regions comprises multiple display pixels. The lenslet array is disposed to be close to the display; and the lenslet array comprises multiple lenslets, and one of the lenslets is corresponding to at least one of the display regions. The light field display control apparatus may be any light field display control apparatus provided in the embodiments of the present application, and the light field display control apparatus is in communication connection with the display.

The display may use the flexible display described above. Or, the display may further comprise: multiple display pixels distributed in an array; and a controllable deformation material part, connected to the multiple display pixels respectively, wherein the controllable deformation material part may deform under the action of an external field, density distribution of the multiple display pixels is adjusted correspondingly through the deformation, and the external field is controlled by the light field display control apparatus.

The structure of the display may be obtained with reference to the corresponding records of FIG. 1*b* to FIG. 1*j*, and the imaging control apparatus may directly control the external field to control the deformation of the controllable deformation material part, thereby adjusting the pixel density distribution of the display; or, the imaging control apparatus may control the external field indirectly by controlling the deformation material part, such that the controllable deformation material part deforms correspondingly to correspondingly adjust the pixel density distribution of the display; and the like. A physical connection manner of the display pixel and the deformation material part may be determined according to actual requirements, as long as the pixel density distribution of the display can be adjusted when the deformation material part is deformed, which is not limited in the embodiment of the present application, and a specific implementation manner may be obtained with reference to the corresponding records in the foregoing. The optical path structure of the light field display device may be obtained with reference to FIG. 2, FIG. 4*a*, FIG. 4*b* and the corresponding records of the foregoing, and is not repeated herein.

In the technical solutions provided in the embodiments of the present application, differentiated spatial resolution of different regions of a light field display image may be presented by fully using pixels of a display of a light field display device, and therefore, requirements of a user on differentiated display of local definition of an image may be met by fully using existing pixels of the display.

In the embodiments of the present application, the serial number and/or sequence of the embodiments is merely used for description, and is not intended to represent merits of the embodiments. The descriptions on the embodiments have their respective emphasis, and for a part that is not described in detail in a certain embodiment, reference may be made to related description in another embodiment. For related descriptions of implementation principles or processes related to the apparatus, device or system embodiments, reference may be made to the records of the corresponding method embodiments, which are not repeated herein.

Persons of ordinary skill in the art should appreciate that, in combination with the examples described in the embodiments herein, units and method steps can be implemented by electronic hardware, or a combination of computer software and electronic hardware. Whether the functions are executed by hardware or software depends on specific applications and design constraint conditions of the technical solutions. Persons skilled in the art can use different methods to implement the described functions for every specific application, but it should not be considered that this implementation goes beyond the scope of the present application.

When being implemented in the form of a software functional unit and sold or used as a separate product, the functions may be stored in a computer-readable storage medium. Based on such understanding, the technical solutions of the present invention essentially, or the part contributing to the prior art, or part of the technical solutions may be implemented in a form of a software product. The computer software product is stored in a storage medium, and comprises several instructions for instructing a computer device (which may be a personal computer, a server, a network device, and the like) to execute all or part of the steps of the method described in each of the embodiments of the present application. The aforementioned storage medium comprises: any medium that can store program codes, such as a USB disk, a removable hard disk, a read-only memory (ROM), a random access memory (RAM), a magnetic disk, or an optical disc.

In the embodiments of the apparatus, method and system of the present application, apparently, each component (such as the system, sub-system, module, sub-module, unit, and sub-unit) or each step may be decomposed, combined and/or re-combined after being decomposed. The decomposition and/or re-combination should be considered as an equivalent solution of the present application. Meanwhile, in the description of the specific embodiments of the present application, a feature described and/or shown for one implementation manner may be used in one or more other implementation manners in an identical or similar way, may be combined with a feature in another implementation manner, or may replace a feature in another implementation manner.

It should be emphasized that the term "comprise/contain" used in this text to indicate existence of a feature, element, step or component, and does not exclude existence or addition of one or more other features, elements, steps or components.

Finally, it should be noted that: the aforementioned description of the implementation manners are merely provided for describing the present application, but not intended to limit the present application. Persons of ordinary skills in the art can also make many variations and changes without departing from the spirit and the scope of the present application. Therefore, all the equivalent technical solutions also fall within the scope of the present application, and the patent protection scope of the present application shall be limited by the claims.

What is claimed is:

1. A light field display control method, comprising:
   determining target pixel density distribution information, wherein determining the target pixel density distribution information comprises:
   determining a first region of a light field image;
   determining a first display region of a display, wherein determining the first display region in the display includes:
   determining light field sub-image information corresponding to the first region in the light field image, and determining the first display region that affects displaying of the light field sub-image information; or
   determining the first display region according to relative location information of pixels in the first region with respect to a reference point of the light field image; and
   determining the target pixel density distribution information according to the first display region, wherein in the target pixel density distribution information, a target pixel density corresponding to the first display region is different from a target pixel density corresponding to a second display region, and the second display region is a display region of the display other than the first display region;
   adjusting display pixel density distribution of a display of a light field display device according to the target pixel density distribution information, so that at least two display regions in the display of the light field display device after the adjustment have different display pixel densities;

performing sampling processing on the light field image according to location information of display pixels of the display of the light field display device after the adjustment; and
displaying, by the light field display device after the adjustment, the light field image undergone the sampling processing.

2. The method of claim 1, further comprising:
preprocessing an image to obtain the light field image.

3. The method of claim 2, wherein preprocessing the image to obtain the light field image comprises:
preprocessing the image according to vision information of a user to obtain the light field image.

4. The method of claim 3, further comprising: acquiring vision information of the user.

5. The method of claim 1, wherein the display of the light field display device comprises display regions respectively corresponding to various lenslets in a lenslet array of the light field display device, and the first display region is distributed in at least one of the display regions.

6. The method of claim 5, wherein the first display region is distributed in at least two of the display regions.

7. The method of claim 1, wherein determining the first region of the light field image comprises:
acquiring region of interest information; and
determining the first region of the light field image according to the region of interest information.

8. The method of claim 1, wherein determining the first region of the image comprises:
performing image analysis on the light field image; and
determining the first region of the light field image according to a result of the image analysis.

9. The method of claim 1, wherein adjusting the display pixel density distribution of the display according to the target pixel density distribution information comprises:
determining deformation control information of a controllable deformation material part according to the target pixel density distribution information; and
controlling, according to the deformation control information, the controllable deformation material part to deform, so as to adjust the display pixel density distribution of the display correspondingly through the deformation of the controllable deformation material part.

10. The method of claim 9, wherein the controllable deformation material part is made of one or more of the following controllable deformation materials: a piezoelectric material, an electroactive polymer, a photoinduced deformation material, and a magnetostrictive material.

11. The method of claim 1, further comprising: performing a balanced control on display brightness of different display regions of the display in a process that the light field display device after the adjustment displays the light field image undergone the sampling processing.

12. A light field display control apparatus, comprising:
a target pixel density distribution information determining sub-module, configured to determine target pixel density distribution information;
a display pixel density distribution adjusting module, configured to adjust display pixel density distribution of a display of a light field display device according to the target pixel density distribution information, so that at least two display regions in the display after the adjustment have different display pixel densities;
an image sampling processing module, configured to perform sampling processing on a light field image according to location information of display pixels of the display after the adjustment; and a light field display controlling module, configured to display, by the light field display device after the adjustment, the light field image undergone the sampling processing;

wherein the target pixel density distribution information determining sub-module comprises:

a first region determining unit, configured to determine a first region of the light field image;

a first display region determining unit configured to determine a first display region in the display that affects displaying of light field sub-image information, wherein a light field sub-image information determining unit is configured to determine the light field sub-image information corresponding to the first region in the light field image, or determine the first display region in the display according to relative location information of pixels in the first region with respect to a reference point of an image; and a target pixel density distribution information determining unit configured to determine the target pixel density distribution information according to the first display region, wherein in the target pixel density distribution information, a target pixel density corresponding to the first display region is different from a target pixel density corresponding to a second display region, and the second display region is a display region of the display other than the first display region.

13. The apparatus of claim 12, further comprising:
an image preprocessing module, configured to perform preprocessing on an image to obtain the light field image.

14. The apparatus of claim 13, wherein the image preprocessing module comprises:
an image preprocessing sub-module, configured to preprocess the image according to vision information of a user to obtain the light field image.

15. The apparatus of claim 14, further comprising:
a vision information acquiring module, configured to acquire vision information of the user.

16. The apparatus of claim 12, wherein the display comprises display regions respectively corresponding to various lenslets in a lenslet array of the light field display device, and the first display region is distributed in at least one of the display regions.

17. The apparatus of claim 16, wherein the first display region is distributed in at least two of the display regions.

18. The apparatus of claim 12, wherein the first region determining module comprises:
a region of interest information acquiring sub-unit, configured to acquire region of interest information; and
a region of interest determining sub-unit, configured to determine the first region of the light field image according to the region of interest information.

19. The apparatus of claim 12, wherein the first region determining module comprises:
an image analysis sub-unit, configured to perform image analysis on the light field image; and
a first region determining sub-unit, configured to determine the first region of the light field image according to a result of the image analysis.

20. The apparatus of claim 12, wherein the target pixel density distribution information determining sub-module comprises:

a deformation control information determining unit, configured to determine deformation control information of a controllable deformation material part according to the target pixel density distribution information; and a deformation controlling unit, configured to control, according to the deformation control information, the controllable deformation material part to deform, so as to adjust the display pixel density distribution of the display correspondingly through the deformation of the controllable deformation material part.

21. The apparatus of claim 20, wherein the controllable deformation material part is at least made of one or more of the following controllable deformation materials: a piezoelectric material, an electroactive polymer, a photoinduced deformation material, and a magnetostrictive material.

22. The apparatus of claim 12, further comprising:
a brightness balanced control module, configured to perform a balanced control on display brightness of different display regions of the display in a process that the light field display device after the adjustment displays the light field image undergone the sampling processing.

23. A light field display device, comprising:
a display;
a lenslet array; and
the light field display control apparatus of claim 12, the light field display control apparatus being in communication connection with the display.

24. The light field display device of claim 23, wherein:
the display comprises multiple display regions, and one of the display regions comprises multiple display pixels; and
the lenslet array is disposed to be close to the display, comprises multiple lenslets, and one of the lenslets is corresponding to at least one of the display regions.

25. The light field display device of claim 23, wherein the display comprises:
multiple display pixels distributed in an array; and
a controllable deformation material part, connected to the multiple display pixels respectively, wherein the controllable deformation material part deforms under an action of an external field, density distribution of the multiple display pixels is adjusted correspondingly through the deformation, and the external field is controlled by the light field display control apparatus.

26. A computer readable storage apparatus, comprising at least one executable instruction, which, in response to execution, causes a processor to perform a light field display control method, the light field display control method comprising:

determining target pixel density distribution information, wherein determining target pixel density distribution information comprises:

determining a first region of a light field image;

determining a first display region of a display, wherein determining the first display region in the display includes:

determining light field sub-image information corresponding to the first region in the light field image, and determining the first display region that affects displaying of the light field sub-image information; or determining the first display region according to relative location information of pixels in the first region with respect to a reference point of the light field image; and determining the target pixel density distribution information according to the first display region, wherein in the target pixel density distribution information, a target pixel density corresponding to the first display region is different from a target pixel density corresponding to a second display region, and the second display region is a display region of the display other than the first display region;

adjusting display pixel density distribution of a display of a light field display device according to the target pixel density distribution information, so that at least two display regions in the display of the light field display device after the adjustment have different display pixel densities;

performing sampling processing on the light field image according to location information of display pixels of the display of the light field display device after the adjustment; and displaying, by the light field display device after the adjustment, the light field image undergone the sampling processing.

27. A light field display control apparatus, characterized by comprising a processor and a memory, the memory storing computer executable instructions, the processor being connected to the memory through a communication bus, and when the apparatus for controlling task migration operates, the processor executing the computer executable instructions stored in the memory, so that the apparatus for controlling task migration executes operations comprising:

determining target pixel density distribution information, wherein determining target pixel density distribution information comprises:

determining a first region of a light field image;

determining a first display region of a display, wherein determining the first display region in the display includes:

determining light field sub-image information corresponding to the first region in the light field image, and determining the first display region that affects displaying of the light field sub-image information; or determining the first display region according to relative location information of pixels in the first region with respect to a reference point of the light field image; and determining the target pixel density distribution information according to the first display region, wherein in the target pixel density distribution information, a target pixel density corresponding to the first display region is different from a target pixel density corresponding to a second display region, and the second display region is a display region of the display other than the first display region;

adjusting display pixel density distribution of a display of a light field display device according to the target pixel density distribution information, so that at least two display regions in the display of the light field display device after the adjustment have different display pixel densities;

performing sampling processing on the light field image according to location information of display pixels of the display of the light field display device after the adjustment; and displaying, by the light field display device after the adjustment, the light field image undergone the sampling processing.

* * * * *